(12) United States Patent
Watson

(10) Patent No.: US 10,558,264 B1
(45) Date of Patent: Feb. 11, 2020

(54) MULTI-VIEW DISPLAY WITH VIEWER DETECTION

(71) Applicant: X Development LLC, Mountain View, CA (US)

(72) Inventor: Philip Edwin Watson, Santa Cruz, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/386,691

(22) Filed: Dec. 21, 2016

(51) Int. Cl.
*G06F 3/01* (2006.01)
*G06T 11/60* (2006.01)

(52) U.S. Cl.
CPC ............. *G06F 3/013* (2013.01); *G06F 3/012* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,357,438 A | 10/1994 | Davidian | |
| 5,594,414 A | 1/1997 | Namngani | |
| 5,712,732 A | 1/1998 | Street | |
| 6,408,247 B1 | 6/2002 | Ichikawa et al. | |
| 7,132,635 B2 | 11/2006 | Dowling | |
| 7,206,131 B2 | 4/2007 | Alden | |
| 7,880,739 B2 | 2/2011 | Long et al. | |
| 7,978,407 B1 * | 7/2011 | Connor | H04N 13/32 359/463 |
| 9,390,558 B2 | 7/2016 | O'Brien | |
| 9,715,827 B2 | 7/2017 | Ng et al. | |
| 9,760,782 B2 | 9/2017 | Augst | |
| 2002/0090131 A1 | 7/2002 | Alden | |
| 2002/0117605 A1 | 8/2002 | Alden | |
| 2003/0112521 A1 | 6/2003 | Gardiner et al. | |
| 2004/0252187 A1 | 12/2004 | Alden | |
| 2008/0012938 A1 | 1/2008 | Kubota | |

(Continued)

FOREIGN PATENT DOCUMENTS

| | | |
|---|---|---|
| CN | 1495096 | 5/2004 |
| CN | 101625215 | 1/2010 |

(Continued)

OTHER PUBLICATIONS

'content.time.com' [online]. "Invisible Technology," 2003, [retrieved on Dec. 21, 2016]. Retrieved from the Internet: URL<http://content.time.com/time/specials/packages/article/0,28804,1935038_1935085_1935990,00.html> 1 page.

(Continued)

*Primary Examiner* — Yi Wang
(74) *Attorney, Agent, or Firm* — Fish & Richardson P.C.

(57) ABSTRACT

Methods, systems, and apparatus for generating images that blend an appearance of a display with an environment of the display. In some aspects, output is provided from a display that occludes an object. A gaze direction is determined for an observer located within an environment of the display. An image is generated based on the determined gaze direction of the observer. The generated image is configured to blend an appearance of the display with the environment of the display. The generated image is displayed on the display directed to the observer.

21 Claims, 10 Drawing Sheets

(56) References Cited

U.S. PATENT DOCUMENTS

| | | | | |
|---|---|---|---|---|
| 2008/0310675 | A1* | 12/2008 | O'Brien | G06T 19/00 382/100 |
| 2009/0140881 | A1 | 6/2009 | Sakai et al. | |
| 2010/0002079 | A1 | 1/2010 | Krijn et al. | |
| 2010/0253601 | A1 | 10/2010 | Seder | |
| 2010/0315215 | A1 | 12/2010 | Yuda | |
| 2012/0287266 | A1 | 11/2012 | Varekamp | |
| 2013/0181823 | A1 | 7/2013 | Stahlin | |
| 2014/0019005 | A1 | 1/2014 | Lee et al. | |
| 2014/0028549 | A1* | 1/2014 | Yuan | G06F 3/013 345/156 |
| 2014/0043433 | A1 | 2/2014 | Scavezze | |
| 2014/0168277 | A1* | 6/2014 | Ashley | G06F 3/1446 345/672 |
| 2014/0288817 | A1 | 9/2014 | Dowdall et al. | |
| 2014/0313365 | A1* | 10/2014 | Lehtiniemi | H04N 5/23229 348/222.1 |
| 2015/0002642 | A1 | 1/2015 | Dressler | |
| 2015/0154445 | A1* | 6/2015 | Biswas | G06K 9/00604 345/2.3 |
| 2015/0235398 | A1 | 8/2015 | Kim | |
| 2015/0258991 | A1 | 9/2015 | Fletcher et al. | |
| 2015/0310273 | A1 | 10/2015 | Shreve | |
| 2016/0297362 | A1 | 10/2016 | Tijerina et al. | |
| 2018/0129888 | A1 | 5/2018 | Schubert et al. | |

FOREIGN PATENT DOCUMENTS

| | | |
|---|---|---|
| CN | 105511216 | 4/2016 |
| DE | 202011104126 | 12/2011 |
| EP | 2168815 | 3/2010 |
| EP | 2511121 | 10/2012 |

OTHER PUBLICATIONS digitaltrends.com [online]. "New Invisibility Cloak Device Can Hide Almost Anything," Sep. 2014, [retrieved on Dec. 21, 2016] Retrieved from Internet: URL<http://www.digitaltrends.com/cool-tech/new-invisibility-cloak-device-can-hide-almost-anything/> 5 pages.

'iq.intel.com' [online]. "The Science Behind Real-Life Invisibility Cloaks," Feb. 2015, [retrieved on Dec. 21, 2016]. Retrieved from the Internet: URL<http://iq.intel.com/science-behind-real-life-invisibility-cloaks/> 9 pages.

'wired.com' [online]. "The Super Power Issue: Being Invisible," Aug. 2003, [Retrieved on Dec. 21, 2016] Retrieved from the Internet: URL<https://www.wired.com/2003/08/pwr-invisible/> 5 pages.

'pas.rochester.edu' [online]. "Practical Invisibility Cloaking," 2016, [retrieved on Dec. 21, 2013] Retreieved from the Internet: URL<http://www.pas.rochester.edu/~jhgroup/alumni_theses/choi_thesis.pdf> 139 pages.

'rochester.edu' [online]. "'cloaking' device uses ordinary lenses to hide objects across range of angles," Sep. 2014 [retrieved on Dec. 21, 2016] Retrieved from the Internet: URL<http://www.rochester.edu/newscenter/watch-rochester-cloak-uses-ordinary-lenses-to-hide-objects-across-continuous-range-of-angles-70592/> 6 pages.

'wikipedia.com' [online]. "Active camouflage," Nov. 2016, [retrieved on Dec. 21, 2016] Retrieved from the Internet: URL<https://en.wikipedia.org/w/index.php?title=Active_camouflage&action=history> 4 pages.

'quora.com' [online]. "How much of the technology in Mission: Impossible—Ghost Protocol feasible today?," May 2014, [retrieved on Dec. 21, 2016] Retrieved from the Internet: URL<https://www.quora.com/How-much-of-the-technology-in-Mission-Impossible-Ghost-Protocol-feasible-today> 3 pages.

'tvtropes.org' [online]. "Mission: Impossible—Ghost Protocol," [retrieved on Nov. 10, 2016] Retrieved from Internet: URL<http://tvtropes.org/pmwiki/pmwiki.php/Film/MissionImpossibleGhostProtocol> 2 pages.

Li et al. "Hiding Under the Carpet: a New Strategy for Cloaking," Physical Review Letters 101, No. 20, 2008, 11 pages.

'livescience.com' [online]. "Ultrathin 'Invisibility Cloak' Can Match Any Background," Sep. 2015, [retrieved on Dec. 21, 2016] Retrieved from the Internet: URL<http://www.livescience.com/52216-ultrathin-invisibility-cloak.html> 3 pages.

'physics.org' [online]. "How do Invisibility Cloaks Work," [retrieved on Dec. 21, 2012] Retrieved from the Internet: URL<http://www.physics.org/article-questions.asp?id=69> 2 pages.

'wikipedia.org' [online]. "light field," Oct. 2016, [retrieved on Dec. 21, 2016] Retrieved from the Internet: URL<https://en.wikipedia.org/w/index.php?title=Light_field&action=history> 7 pages.

Lanman et al. "Near-Eye Field Displays," ACM Transactions on Graphics (TOG) 32.6, Nov. 2013, 10 pages.

'fovi3d.com' [online]. "FOVI3D," [retrieved on Dec. 21, 2016] Retrieved from the Internet: URL<http://www.fovi3d.com/light-field-display/> 3 pages.

'newatlas.com' [online]. "Samsung creates "transparent" truck," Jun. 2015, [retrieved on Dec. 21, 2016] Retrieved from Internet: URL< http://newatlas.com/samsung-safety-truck-cameras-screens/38122/> 2 pages.

'mashable.com' [online]. "Samsung attaches screen to semi-truck to show the road ahead," [retrieved on Dec. 21, 2016] Retrieved from Internet: URL<http://mashable.com/2015/06/22/samsung-truck-camera/#4X1C2wKKZkqM> 4 pages.

'bee-inc.com' [online]. "How to Look at Invisible Buildings | South Korea's Tower Infinity," Sep. 2013, [retrieved on Dec. 21, 2016] Retrieved from Internet: URL<https://www.bee-inc.com/tag/gds-architects/> 2 pages.

'aparchive.com' [online] "[HZ] Japan Car" Nov. 12, 2012, [retrieved on Apr. 5, 2017] Retrieved from Internet: URL<http://www.aparchive.com/metadata/youtube/c49a297ce1422b3f9f203e4ffed24420> 4 pages.

'livescience.com' [online] "Ultrathin 'Invisibility Cloak' Can Match Any Background," Jesse Emspak, Sep. 17, 2015 [retrieved on Feb. 6, 2017] Retrieved from Internet: URLhttp://www.livescience.com/52216-ultrathin-invisibility-cloak.html> 6 pages.

'news.samsung.com' [online] "The Safety Truck Could Revolutionize Road Safety," Jun. 18, 2015 [retrieved on Feb. 6, 2017] Retrieved from Internet: URL< https://news.samsung.com/global/the-safety-truck-could-revolutionize-road-safety> 3 pages.

Bukhari et al. "An intelligent real-time multi-vessel collision rise assessment system from VTS view point based on fuzzy inference system," Expert Systems with Applications 40(4), Jan. 2012, 12 pages.

Conesa et al. "Display Blocks: Cubic Displays for Multi-Perspective Visualizations," Master's Thesis, Massachusetts Institute of Technology, Sep. 2012, 111 pages.

Gomes et al. "The See-Through System: From Implementation to Test-Drive," IEEE, Vehicular Networking Conference, Nov. 14, 2012, 9 pages.

International Search Report issued in International Application No. PCT/US2017/059840, dated Feb. 14, 2018, 10 pages.

Ni et al. "An ultrathin invisibility skin cloak for visible light," Science 349.6254, Sep. 18, 2015, 6 pages.

Office Action issued in U.S. Appl. No. 15/343,483, dated Aug. 29, 2018, 31 pages.

Pendry. "Hiding Under the Carpet: a New Strategy for Cloaking," arXiv preprint arXiv 0806.1396v1, Jun. 26, 2008, 11 pages.

Weidl et al. "Collision Rise Prediction and Warning at Road Intersections Using an Object Orientated Bayesian Network," ACM, Proceedings of the 5th International Conference on Automotive User Interfaces and Interactive Vehicular Applications, Oct. 2013, 9 pages.

PCT International Preliminary Report on Patentability in International Appln. No. PCT/US2017/059840, dated May 16, 2019, 7 pages.

\* cited by examiner

MULTI-VIEW DISPLAY WITH VIEWER DETECTION

TECHNICAL FIELD

This specification relates to the field of display devices.

BACKGROUND

Multi-view displays can provide light directed to specific angles of view. In some instances, multi-view displays can be used to present different images to viewers located at different locations. As a result, viewers looking at a single multi-view display may simultaneously perceive different images to be shown.

SUMMARY

This specification describes systems and methods for generating images that make an occluded object appear to be invisible. For example, a display can be placed in front of an object to occlude the object. An image that represents a background scene behind the object can be shown on the display. The image is configured to blend the appearance of the display with the environment of the display. For example, the image presented to a viewer can show the background scene as it would appear from the perspective of the viewer. The content of the image shown at the edges of the display can be aligned with the unoccluded portions of the background scene that are visible next to the display. As a result, in some implementations, the displayed image can provide a smooth transition between the edge of the display and the direct view of the background scene.

The display can be a multi-view display that can project light in specific directions. In some implementations, the multi-view display may include elements that direct light to relatively narrow angle ranges. With these directional elements, the display can concurrently present different images to viewers at different locations. For example, the display can include an array of refractive microstructures arranged in a pattern of pixels. Each refractive microstructure may be associated with an array of subpixels that each provided somewhat collimated light. The collimated light can be directed to specific angles by the refractive microstructures. Therefore, a single display may provide different images to multiple viewers at the same time, where each viewer sees a personalized image.

The system can use eye-tracking techniques to generate the images shown on the display. In some implementations, the system does not attempt to simulate invisibility from all possible viewing directions. Instead, the system identifies viewing directions of actual viewers who are looking toward the display, and then generates and provides images for those viewers in response. The system may generate and display images only for the viewing directions where viewers are detected or expected to be. For example, the system can use cameras or other sensors to detect people near the display, and also detect head position, eye position, and other information that indicates where people are looking. If the system does not identify any people in a region, the system may not generate or display images for viewing directions for that region. Similarly, when the system determines that a person is located nearby but is looking away from the display, the system does not generate an image for that person's viewing direction either. By contrast, when a user looks toward the display, the system detects the user's gaze with eye-tracking techniques, and generates an image that blends the display with the environment.

The system can use information about a viewer's location and movement to generate the images shown to the viewer. For example, the system can use cameras or other sensors to determine a location of a viewer and movement of the viewer. As a user moves relative to the display, the system updates the image content presented to the user to adjust for changes in the viewer's perspective. For example, the system can adjust which portion of the background scene is shown to the viewer, as well as the relative size and position of elements, the direction that the image is output, and other factors. Through real-time updates to the image, such as with a dynamic video stream generated for a viewer, the system can maintain the appearance of the display blending into the background scene while the user is moving.

The systems and methods described in this specification may be applied to any scenario where an object disturbs an environment in which it is located, e.g., a temporary construction in a park or a building located on the corner of a busy intersection. By placing a display as described in this specification in front of the object of disturbance, viewers of the display may be provided with an image that makes both the display and the object appear invisible. In some settings this can increase the safety of the viewers of the display. For example, by making a building located at the corner of a busy intersection appear invisible, drivers approaching the intersection can be made more aware of vehicles or pedestrians approaching the intersection from another direction.

Different viewers of the display may be shown different images that are personalized according to their current gaze direction. For example, at a given instance in time, a first viewer who is looking directly at the display may be provided with a high-fidelity image of the scene behind the occluded object, e.g., a high-resolution image. A second viewer who is not looking directly at the display, e.g., in a direction perpendicular to the display, may be provided with a low-fidelity image of the scene behind the occluded object, e.g., a low-resolution image. A third viewer who is looking in an opposite direction to the display may not be shown an image at all. Using eye-tracking to limit the number of directions that high-fidelity views are provided greatly increases the computational efficiency of the system. The system provides high-fidelity views to viewers who are actually observing the display, while avoiding unnecessary processing to generate images for directions where the images may be seen only peripherally or not at all.

Innovative aspects of the subject matter described in this specification may be embodied in methods that include the actions of providing output from a directional multi-view display that occludes an object; determining a gaze direction of an observer located within an environment of the multi-view display; generating an image based on the determined gaze direction of the observer, the generated image being configured to blend an appearance of the multi-view display with the environment of the multi-view display; and displaying the generated image on the multi-view display directed to the observer.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, generating an image being configured to blend an appearance of the multi-view display with an environment of the multi-view display includes using data representing images taken by from one or more cameras directed toward the multi-view display to capture an image that includes at least a portion of the multi-view display and an adjacent view of the environment.

In some implementations, a method or system determines a distance between the observer and the display, and generating an image based on the determined gaze direction of the observer includes generating an image based on (i) the determined gaze direction of the observer, and (ii) the determined distance of the observer.

In some implementations, a method or system determines a position of the observer relative to the display, and generating an image based on the determined gaze direction of the observer includes generating an image based on (i) the determined gaze direction of the observer, and (ii) the determined position of the observer.

In some implementations, a method or system determines a measure of attentiveness of the observer to the multi-view display, and generating an image based on the detected eye direction of the observer includes generating an image based on (i) a detected eye direction of the observer, and (ii) the determined measure of attentiveness.

In some implementations, a method or system determines preferences associated with the observer, and generating an image based on the detected eye direction of the observer includes generating an image based on (i) a detected eye direction of the observer, and (ii) the preferences associated with the observer.

In some implementations, a method or system: determines respective gaze directions of multiple observers located at different locations with respect to the multi-view display; generates, for each of the multiple observers, an image based on the gaze direction of the observer, each generated image being configured to provide a view to the observer that blends (i) an appearance of the multi-view display from a perspective of the observer with (ii) an appearance of the environment of the multi-view display from the perspective of the observer; and concurrently displays the generated images on the multi-view display, each of the generated images is directed to the corresponding observer.

In some implementations, determining respective gaze directions of multiple observers located at different locations with respect to the multi-view display includes: identifying multiple observers located within the environment of the multi-view display; assigning, for each of the multiple observers, a priority score indicative of a predicted likelihood that the observer is engaged with the display; selecting a proper subset of the multiple observers based on the assigned priority scores, and determining respective gaze directions of each observer in the subset of observers.

In some implementations, assigning the priority scores includes assigning, for each of the one or more observers, a priority score based on one or more of (i) position of the observer, (ii) distance of observer from the display, or (iii) attentiveness of the observer to the display.

In some implementations, a method or system dynamically changes the displayed image on the multi-view display as the determined gaze direction of the observer changes.

In some implementations, generating an image based on the determined gaze direction of the observer includes generating an image that provides a view of the scene behind the occluded object from the perspective of the observer.

In some implementations, generating an image based on the determined gaze direction of the observer includes augmenting an image representing the scene to include one or more added visual elements that are not in the environment of the multi-view display.

In some implementations, a method or system generates an image that represents a simplified version of the scene.

In some implementations, displaying the generated image on the multi-view display directed to the observer includes: receiving data indicating one or more interactions of the observer with a user device while in proximity to the multi-view display; and generating an image based on (i) the determined gaze direction of the observer and (ii) the data indicating one or more interactions of the observer with a user device while in proximity to the multi-view display.

In some implementations, generating an image based on the determined gaze direction of the observer includes applying machine learning techniques to generate one or more portions of the image.

The subject matter described in this specification can be implemented in particular embodiments so as to realize one or more of the following advantages. For example, the techniques described can greatly enhance the computational efficiency of simulating invisibility of an object for viewers from different positions. Generally, active camouflage systems assume that a viewer of may be located in any direction, or at least any direction within a large range. As a result, these systems often require rendering of an image that would simulate invisibility for every possible viewing location. In some cases, e.g., when the multi-view display is located in an open space, the number of possible viewing locations can be very large, and the task of rendering an image for each possible viewing location can be intractable because it requires excessive computational resources.

In some implementations, as described in this specification, a system providing active camouflage does not assume that a viewer of a multi-view display may be located in any direction. Rather, the system can be configured to detect possible viewers of the display and to determine an eye gaze direction of each detected possible viewer. Images are rendered based on the determine eye gaze directions. For example, images may only be rendered for viewers who are looking in a direction towards the display. In this manner, the number of images required to be rendered by the system is reduced to a tractable number that can be processed effectively with reasonable computational resources.

In addition, the type of images rendered by the system described in this specification may be based on additional information associated with viewers of the multi-view display. For example, viewers who are located close to the display may be shown high-fidelity images, whereas viewers who are located far away from the display may be shown low-fidelity images. Other viewer attributes such as viewer position or attentiveness may also be taken into consideration. For example, even if the display is in a viewer's field of view, a low-fidelity view may be provided if the system determines that the viewer's attention is focused in another area. Therefore, the system is not required to render high-fidelity images for each viewer. These techniques may also reduce the computational resources required by the system and improve efficiency.

In some cases the systems and methods described in this specification can be used to reduce the number or seriousness of collisions at critical locations. For example, by displaying a dynamic representation of a scene behind an occluded object such that at any point in time the display appears to blend with the environment around the display, a viewer can observe the scene behind the occluded object. In response to viewing the scene behind the occluded object, an observer may take appropriate action to avoid collisions, thus improving road, intersection or crossing safety.

In some cases the systems and methods described in this specification can be used to provide targeted or location relevant advertisements. For example, a user may subscribe to the service provided by the display and be shown advertisements that are determined to be of particular interest or relevance to the user. In addition, the systems and methods described in this specification can provide a paid service for specific augmented reality content. For example, a user may subscribe to the service provided by the display and be shown virtual environments that are determined to be of particular interest or relevance to the user, e.g., a virtual zoo.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a multi-view display system that can cloak or hide an object so it appears invisible from multiple viewing positions. The system includes a display that, for each of the multiple viewing positions, shows an image that provides a view of a scene behind the object. The image is generated such that the appearance of the display blends with the environment of the display. In this manner, the object appears invisible from each of the multiple viewing positions.

The display may be provided by a material that can be draped over or positioned in front of an object. The display can include a set of directional multi-view elements, enabling a single display to concurrently show different images to viewers at different locations.

The images shown on the display are rendered based on information about the environment in which the display is located, e.g., an environment behind the object, the outer edges of the display, and areas of the environment that are adjacent to the display. This information may be gathered through a system of sensors. For example, an eye-tracking system may determine respective gaze directions of viewers of the display. The determined gaze directions may be used to generate one or more images to be shown on the display. For example, in response to determining that a viewer is looking directly at the display, a high-fidelity image of the scene behind the object may be shown to the viewer. In response to determining that a viewer is looking away from the display, a low-fidelity image of the scene behind the object, or a default image, may be shown to the viewer.

Figure 1A:
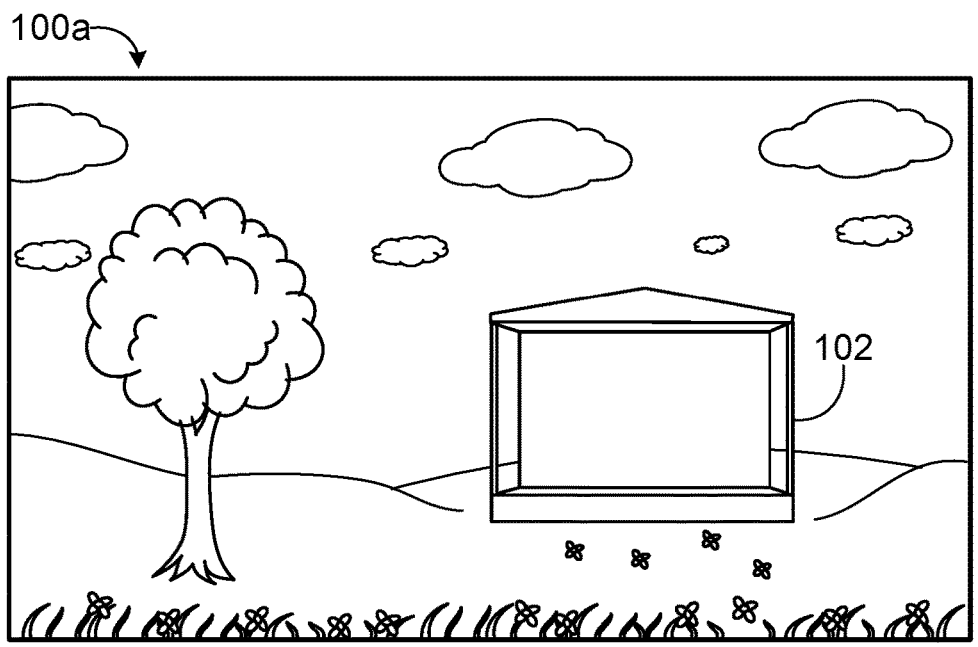
FIG. 1A depicts an example scene of an environment that does not include an multi-view display system.

FIG. 1A shows an example scene 100a of an environment that includes an object 102. The example scene 100a shows a view from the perspective of an observer of the object 102. For example, the observer may be someone walking through a park.

The observer is walking past the object 102 that is located in the environment. The object 102 shown in FIG. 1A is a stage, e.g., set up in the park for outdoor concerts or other events. However, the object could be other temporary or permanent objects such as a construction site, fenced-off area, communication tower or other public service building. The object 102 acts as a barrier that obstructs the observer's view of the environment.

In some cases, e.g., as shown in FIG. 1A, the obstruction of the observer's view of the environment is ugly or unsightly. In other cases the obstruction of the observer's view of the environment can be more serious. For example, in some cases the object 102 may be a building at a road intersection that obstructs the observer's view of moving objects such as vehicles or cyclists that may be approaching the intersection.

Figure 1B:
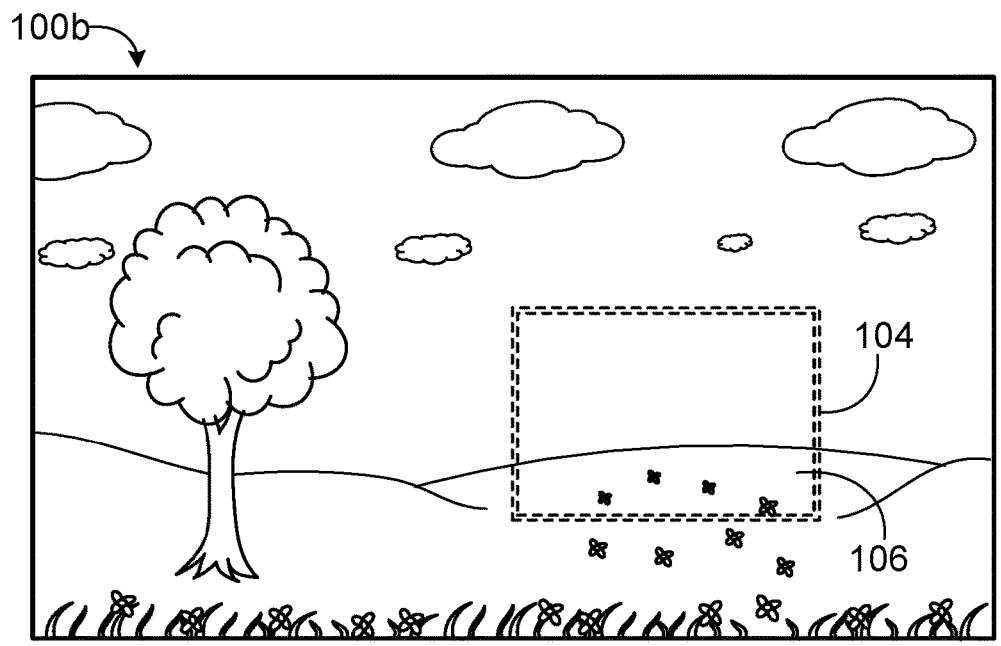
FIG. 1B depicts an example scene of an environment that includes an multi-view display system.

FIG. 1B shows an example scene 100b of the same environment. The example scene 100b also shows a view from the perspective of the observer described above. The example scene 100b includes a display 104 that is located between the observer and the object 102 shown in FIG. 1A. The display 104 shows an image 106 that blends the appearance of the display with the observer's view of the environment adjacent the display. As shown in the example scene 100b, the display shows an image 106 that provides a view of the scene behind the object 102 from the perspective of the observer, e.g., continuing the landscape scene.

To provide an appropriate view to the observer and also concurrently provide different views to other observers, the display 104 can be a multi-view display. A multi-view display is a digital information display which has the ability to, in a controlled manner, concurrently provide different image outputs in at least two different viewing directions. For example, a multi-view display may direct light showing a first type of image content to one viewing position in a room, whilst directing light showing a second type of image content that is different to the first type of image content to a second viewing position. Additional viewing positions may respectively receive further types of content. In some cases one or more viewing positions may receive the same content, e.g., in cases where the viewing positions are close together. In some cases one or more viewing positions may receive augmented content, such as a same type of image content presented to another seating position but with additional statistics overlaid on the image.

An example of a multi-view display is a multi-view light field display. For example, the display 104 may include an array of light emitting elements each having refractive microstructures, e.g., diverting lenses, arranged as a pattern of pixels, e.g., laid out a grid or other pattern. The refractive microstructures define separate spatial regions where light can be independently directed. For example, a pixel may have a number of sub-pixel regions that provide light to different angular ranges. As a result, a horizontal angular range may be divided among the various sub-pixels. For example, a pixel configured to selectively provide light across a 180° range may include 18 different sub-pixel elements that can each direct light in a 10° range. In general, each sub-pixel element may be configured to provide light to a range of approximately 2-20°. If a convex display or flexible display is used, it may be desirable for a pixel to be able to provide light to a range greater than 180°. The colors and intensities of light from each sub-pixel may be independently controlled. Each pixel generally includes one or more light sources, such as one or more light-emitting diodes for each sub-pixel element.

The image 106 shown on the display 104 is rendered dynamically such that, at any point in time, the image 106 provides a view of the scene behind the object 102, as it would be seen from the current perspective of the observer. For example, as the observer walks past or towards the object 102, the image 106 shown on the display 104 dynamically changes such that the image 106 blends the appearance of the display with the environment of the display. For example, the size in which objects are represented in the image 106 may change, e.g., increasing as the observer walks towards the display, so that the image 106 appears as realistic as possible and blends with the environment. The current perspective of the observer may be determined by tracking a gaze direction of the observer using an eye-tracking system. Systems for providing a view of a scene behind an object from a current perspective of an observer are described in more detail below with reference to FIGS. 3A-3B.

The image 106 is dynamically rendered based on information about the scene behind the object 102. For example, information about the scene may be obtained using a system of sensors located at the rear of the object 102, e.g., the side of the object 102 that is opposite to the display 104. In the case where the object 102 is a stage, the system of sensors may be located behind the stage. The image 106 further rendered to blend an appearance of the display 104 with the environment of the display based on information about the scene around the display 104, e.g., portions of the outer edges of the display 104 and an adjacent view of the environment. For example, information about the scene around the display 104 may be obtained using a system of sensors directed toward the display 104. Systems for generating images that blend an appearance of a display with an environment of the display are described in more detail below with reference to FIGS. 3A-3B.

In some cases, the image 106 shown on the display 104 may be a high-fidelity or fine-grained image. The high-fidelity version of the image 106 can be generated and provided when the system determines that the viewer's gaze and/or attention is directed at the display 104. In some implementations, this may occur when the display 104 is determined to be in the field of view of the viewer. In some implementations, the high-fidelity version is provided only when the system detects a viewer's gaze being directed at the display 104, for example, when the display 104 falls within a certain portion of the user's view, e.g., 15°, 30°, etc., of the central gaze direction of the viewer. As an example, an image 106 showing a high-resolution view of the scene behind the object 102 from the perspective of the observer. This view may include many details and high-frequency texture, e.g., a view of the scene that includes details such as varying shades of grass or other ground, flowers or clouds in the sky. In some implementations, the high-fidelity version of the image 106 may be updated or refreshed at a relatively high rate, e.g., 5 frames per second, 15 frames per second, 30 frames per second, etc. In essence, a customized video stream may be rendered for the viewer and shown on the display 104, directed to the viewer's location. This may effectively simulate invisibility by compensating for movement of the viewer as well as showing movement or changes in the scene behind the object 102 in real time.

In other cases, the image 106 shown on the display 104 may be a low-fidelity or coarse-grained image. As discussed below, this type of image may be generated when the system determines (i) that a viewer is far from the display 104, e.g., beyond a predetermined distance threshold from the display 104, or (ii) that a viewer is not currently directing their gaze or attention on the area of the display 104. As an example, a low-fidelity version of the image 106 may show a low-resolution view of the scene behind the object 102 from the perspective of the observer, e.g., a view of the scene that includes a green area representing the ground of the park and a blue area representing the sky. As another example, the image 106 may represent a simplified view of the scene behind the object 102 from the perspective of the observer, e.g., a view that omits high-frequency patterns present in the scene. As another example, the image 106 may be shown with a relatively low refresh rate, e.g., once per second, once every five seconds, and so on. In some instances, the system may provide a static image that is not updated until the system detects greater attention or a change in position by the viewer. The coarse-grained version can be generated with much less computation and lower requirements for accuracy than the high-fidelity image, which makes the system more feasible for use with multiple viewers. The system can prioritize computing resources to provide the high-fidelity images to the closest and most attentive viewers, while providing many others low-fidelity images.

In some cases, the image 106 shown on the display may be rendered to show elements that are not present in the environment behind the object 102. For example, the image may include one or more added visual elements that are not in the physical environment. In some cases added visual elements may include decorative element, e.g., trees, animals or water fountains. In some cases added visual elements may include augmented reality indicators that can be used to communicate with or instruct an observer, e.g., traffic warning lights or instructions. Example images shown on a display are described in more detail below with reference to FIGS. 5A-5C.

Figure 2A:
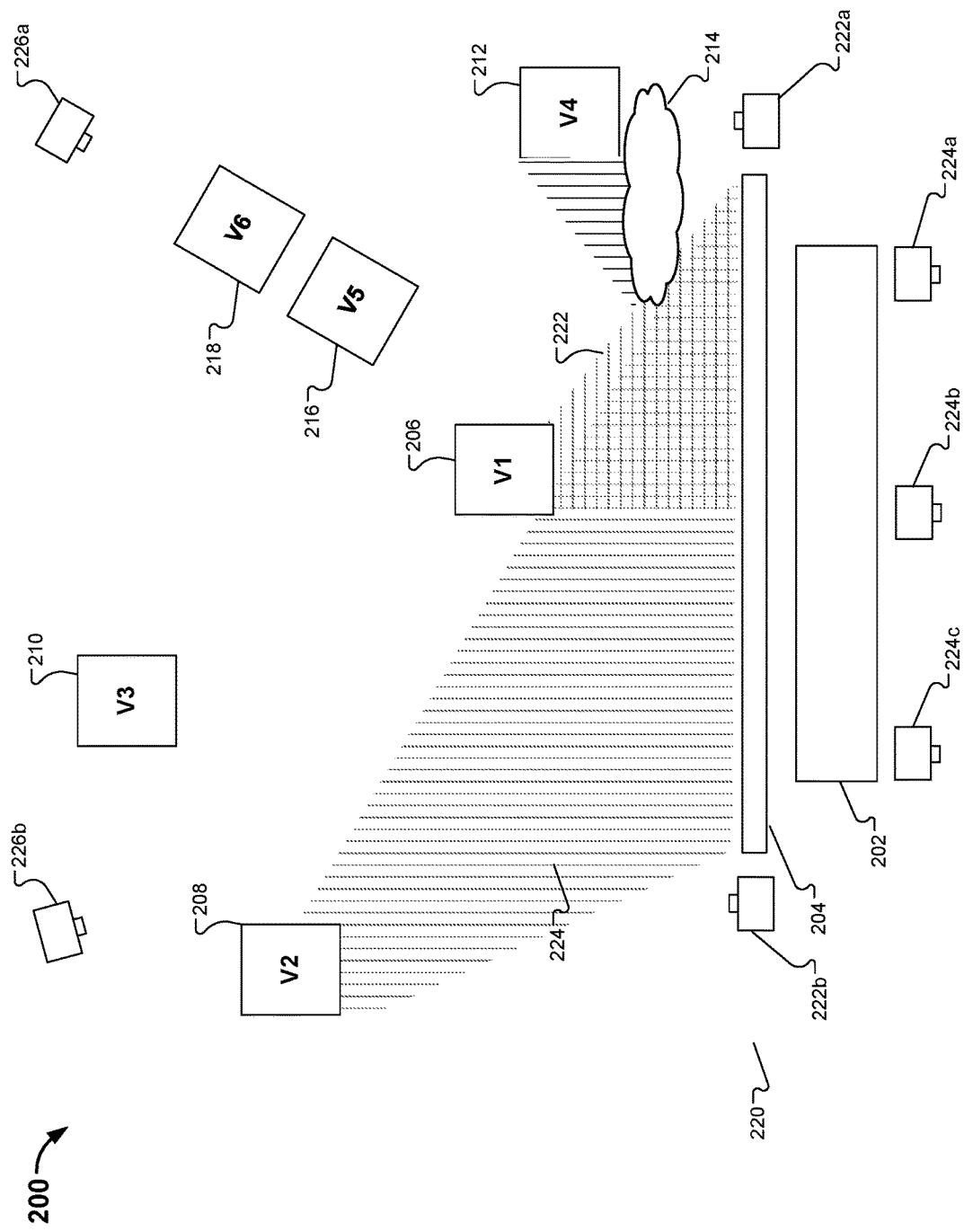
FIG. 2A depicts an example overhead view of a first environment that includes an multi-view display system.

FIG. 2A depicts an example overhead view 200 of a first environment 220 that includes a multi-view display system The example overhead view 200 includes an object 202 that obstructs the view of portions of the environment to viewers 206, 208, 210, 212, 216 and 218. The example overhead view 200 further includes a second object 214. A display 204 is located between the viewers 206, 208, 210, 212, 216, 218 and the object 202. The example overhead view 200 includes multiple observer sensors 222a-b, multiple environment sensors 224a-c, and multiple calibration cameras 226a-b.

The object 202 located in the environment 220 may be a permanent object or a temporary object. For example, as depicted above in FIGS. 1A-1B, the object 202 may be a stage or other construction temporarily set up in a park. The object 202 could also be a communications tower or other public service building permanently located in the park. In these examples the viewers 206, 208, 210, 212, 216, 218 may include, but are not limited to, people walking, running or cycling through the park. The stage may disturb the environment by occluding the normally pleasant view of the park to viewers.

As another example, the object 202 may be a building located at an intersection of two roads. In this example, the viewers 206, 208, 210, 212, 216 and 218 may include drivers of vehicles or pedestrians. The building may occlude vehicles or pedestrians approaching the intersection from one of the roads to vehicles or pedestrians approaching the intersection from the other road. This can lead to dangerous situations or collisions, e.g., if a driver is approaching the intersection on one of the roads at speed and is not aware of a pedestrian who is about to cross the road at the intersection.

As another example, the object 202 may be a wall or other solid construction located in a theatre. In this example the viewers 206, 208, 210, 212, 216 and 218 may include members of the audience. The wall or other solid construction may occlude portions of a stage located in the theatre. For example, audience members sitting at the back of the stalls section at an acute angle relative to the stage may have their view of the stage blocked by a solid construction supporting higher level balconies.

In other examples the viewers 206, 208, 210, 212, 216 and 218 may include viewers that are not human. For example the viewers may include robotic entities, e.g., vehicles that receive instructional synthesized image data, or animals, e.g., zoo animals that are shown an open savanna rather than a side of a reptile house.

As described above with reference to FIGS. 1A-1B, the display 204 is configured to show images that blend the appearance of the display 204 with the environment 220 of the display 204. For example, as described in more detail below with reference to FIG. 3A, the multi-view display system may include one or more environment sensors 224a-c that are configured to gather image data from behind the object 202 occluded by the display 204. The multi-view display system may further include one or more calibration cameras 226a-b that are configured to gather image data from the front of the display, e.g., the edges of the display 204 and an adjacent portion of the environment 220 in which the display 204 is located. The gathered image data may be used to generate an image that blends the appearance of the display 204 with the environment 220 of the display 204. For convenience, three environment sensors 224a-b located directly behind the display 204, and two calibration cameras 226a-b located in the environment 220, are shown in FIG. 2A. However, the multi-view display system may include more or fewer sensors and cameras that are located in different positions within the environment 220.

For example, as shown in the example scene 100b, the display 204 may show an image that provides a view of the scene behind the object 202 from the perspective of an observer of the display 204. For example, in cases where the environment 220 is a park and the display 204 is located in front of a stage, this may include showing an image that continues a landscape scene, making the stage appear invisible. In cases where the environment 220 is an intersection of two or more roads and the display 204 is located in front of a building, this may include showing an image that represents objects that are located behind the building, making some or all of the building appear transparent. In cases where the environment 220 is a theatre and the display 204 is located in front of a wall or other solid construction 202 that blocks portions of a stage, this may include showing an image of the stage scene behind the wall or solid construction, making the wall or solid construction seemingly disappear.

The display 204 is configured to concurrently show different images that are each directed to a respective viewer of the display 204. For example, a first viewer of the display 204 may be shown a first image that blends an appearance of the display 204 from the perspective of the first viewer with an appearance of the environment 220 of the display from the perspective of the first viewer, whereas a second viewer of the display 204 may be shown a second image that blends an appearance of the display 204 from the perspective of the second viewer with an appearance of the environment 220 of the display 204 from the perspective of the second viewer. Both viewers can be shown a respective image that represents a scene that the viewers would see if the object 202 were not present. The display 204 can provide these differing images using directional lighting elements so that the first viewer does not see the image shown to the second viewer, and the second viewer does not see the image shown to the first viewer. In some implementations an image may be directed to multiple viewers of the display, e.g., in cases where the environment includes a group of viewers that are in close proximity to one another.

Each image that is directed to a respective viewer of the display 204 is generated by the multi-view display system based at least on a determined gaze direction of the viewer. For example, as described in more detail below with reference to FIG. 3A, the multi-view display system may include one or more observer sensors 222a-b that are configured to detect the presence of potential viewers of the display in the environment 220. The observer sensors may include eye tracking components that are configured to determine gaze directions of detected viewers. For convenience two observer sensors 222a-b depicted in FIG. 2A are located either side of the display 204, however in some implementations the multi-view display system may include fewer or more observer sensors that are located at different positions in the environment 220, or that are integrated into the display 204.

For example, the multi-view display system may detect the presence of the viewer 206, and determine that the viewer 206 is looking in a direction towards the display 204, e.g., as indicated by the field of view 222. An image to be shown by the display 204 directed to the viewer 206 may then be generated based on determining that the viewer 206 is looking in a direction towards the display. For example, since it is highly likely that the viewer 206 is looking at the display, the generated image may include a high-fidelity image that blends the appearance of the display with the environment of the display. If the environment 220 is a park, this may include a high-fidelity image of the landscape behind the object 202.

In some implementations an image may be shown on a portion of the display 204. For example, if viewer 206 is determined to be looking in a direction towards the display and to be moving away from the display, e.g., from left to right in the context of FIG. 2, the display 204 may show an image on relevant parts of the display 204 only, e.g., not behind the viewer 206 or outside of their field of vision.

Similarly, the multi-view display system may detect the presence of the viewers 216 and 218, and determine that the viewer 216 is looking in a direction towards the viewer 218, and that the viewer 218 is looking in a direction towards the viewer 216, e.g., because the viewers are engaged in a conversation. An image to be shown by the display 204 directed to either of the viewers 216 or 218 may then be generated based on determining that both viewers are not looking in a direction towards the display. For example, since it is highly unlikely that either viewer is looking at the display, the generated image may be a low-fidelity image that blends the appearance of the display with the environment of the display. If the environment 220 is a park, this may include a low-fidelity image of the landscape behind the object, e.g., comprising mainly green pixels representing the ground and blue pixels representing the sky.

Each image that is directed to a respective viewer of the display 204 may generated by the multi-view display system based on additional information determined by the device, such as a distance of the viewer from the display 204, a position of the viewer relative to the display 204, an estimated attentiveness of the viewer to the display 204, or demographics associated with the viewer of the display. For example, it may be determined that the viewer 210 is a distance away from the display 204 that exceeds a predetermined maximum distance. Therefore, even if the viewer 210 is looking in a direction towards the display 204, the viewer 210 may not be shown a customized image on the display. In this case, a non-user-specific image could be displayed, or no image at all. However, if another viewer is determined to be closer to the display 204, e.g., closer than the predetermined maximum distance, the other viewer may be shown an image on the display 204, even if it is only moderately likely that the viewer is looking in a direction towards the display 204. Different types of images may be presented based on the distances of viewers to the display 204. For example, based on determined distances between viewers and the display 204, the viewer 208 may be shown a low-fidelity image on the display 204 and the viewer 206, who is nearer to the display 204, may be shown a high-fidelity image on the display.

As another example, it may be determined that the viewer 212 is looking in a direction towards the display 204, but that at their current position their view of the display 204 is currently occluded by the second object 214 in the environment 220. For example, if the environment 220 is a park, the second object 214 may be a tree or section of shrubs. Therefore, the viewer 212 may not be shown an image on the display. If the viewer 212 is mobile, e.g., walking through the park, the viewer 212 may be shown an image on the display 204 when they have passed the second object 214.

Continuing the example above, it may be determined that the viewers 216 and 218 are engaged in conversation and are not looking in directions towards the display 204. From the tracking data or movement data for these viewers 216 and 218, the system may determine that the viewer's attentiveness to the display 204 is low. Based on determining a low measure of attentiveness to the display 204, the system may select to show low-fidelity images to the viewers 216 and 218, or an image on the display, or may be shown respective low-fidelity images.

As another example, information associated with a viewer may be used to generate an image to be shown on the display 204 directly to the viewer. For example, in cases where the environment 220 is a theatre and the object 202 is a wall blocking the view of portions of the stage to one or more viewers, an image to be shown on the display 204 may be generated dependent on whether the viewers pass certain criteria. For example, a viewer may have bought or subscribed to the service provided by the display, and therefore eligible to be shown an image that appears to make the object 202 invisible. Generating images to be shown on a display directed to respective viewers is described in more detail below with reference to FIG. 4.

For convenience, one display 204 is shown in FIG. 2. However, in some implementations, an environment may include multiple displays. For example, the example overhead view 200 could include one or more additional displays at right angles to the display 204 in order to make the sides of the object 202 also appear invisible.

Figure 2B:
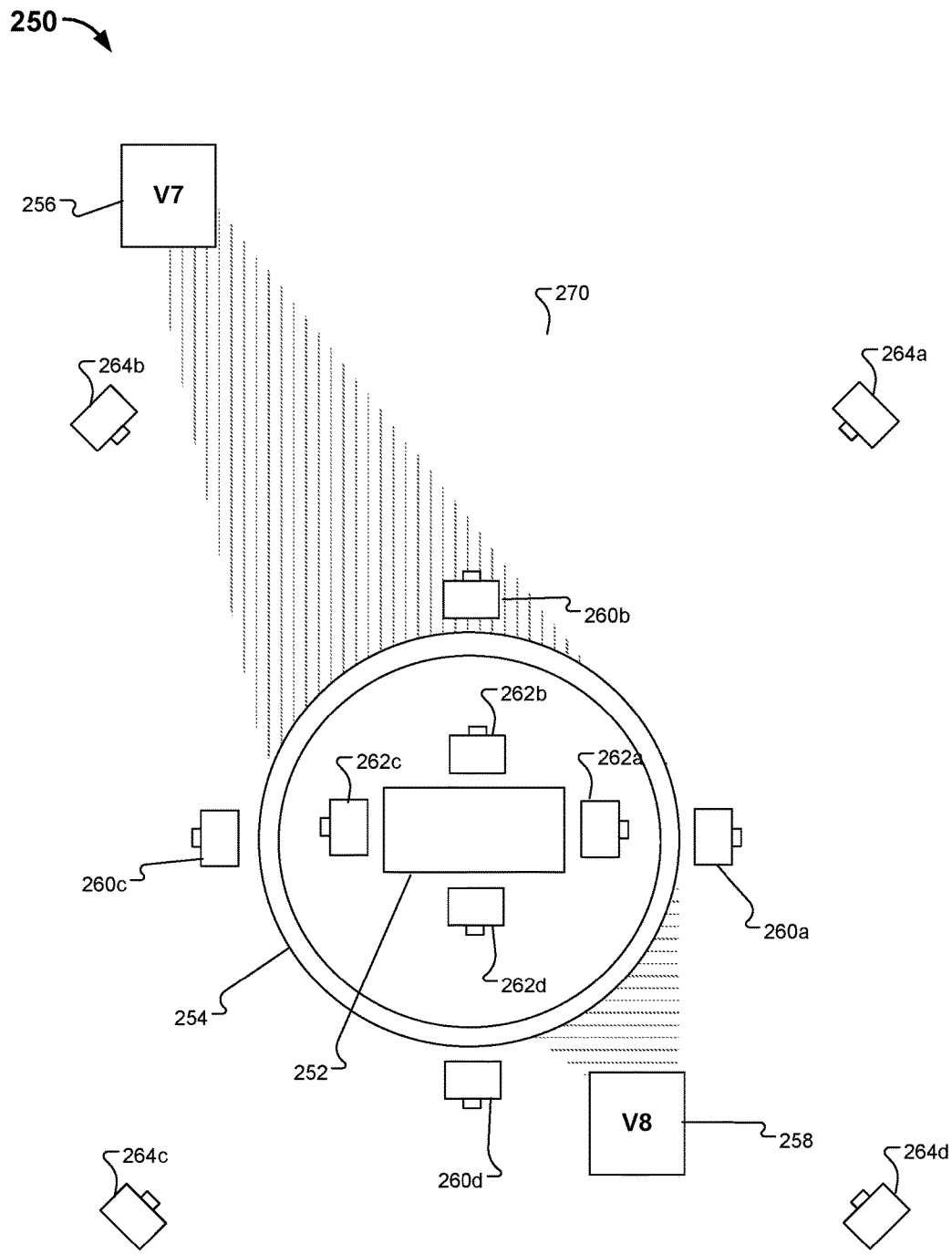
FIG. 2B depicts an example overhead view of a second environment that includes an multi-view display system.

FIG. 2B depicts an example overhead view 250 of a second environment 270 that includes a multi-view display system. The example overhead view 250 includes an object 252 that obstructs the view of portions of the environment 270 to viewers 256 and 258. A display 254 is located between the object 252 and the viewers 256 and 258. The example overhead view 250 includes multiple observer sensors 260a-d, multiple environment sensors 262a-d, and multiple calibration cameras 264a-d.

As described above with reference to FIG. 2A, the object 252 located in the environment 270 may be a permanent object or a temporary object, e.g., a stage, communications tower, building or wall. The display 254 is configured to show images that blend the appearance of the display 254 with the environment 270 of the display 254, e.g., using one or more environment sensors 262a-d and one or more calibration cameras 264a-d. For convenience, four environment sensors 262a-d located behind each side of the object 252 are shown in FIG. 2B, however the multi-view display system may include more or fewer sensors located in different positions. In some cases the number and position of the environment sensors is dependent on properties of the object 252, e.g., the shape of the object 252, the type of sensor used, e.g., whether the sensor has a fixed field of view or a variable field of view, and the shape of the display, e.g., whether the display encloses the object 252 or not. Similarly, for convenience four calibration cameras 264a-d are shown in FIG. 2B, however the multi-view display system may include more or fewer sensors located in different positions. In some cases the number and position of the calibration cameras is dependent on the type of sensor used, e.g., whether the sensor has a fixed field of view or a variable field of view, and the shape of the display, e.g., the size of the display.

As described above with reference to FIG. 2A, the display 254 is configured to concurrently show different images that are each directed to a respective viewer of the display 254, e.g., using directional lighting elements. The example display 254 is a continuous display that extends around multiple sides of object 252. For convenience, the display 254 is shown as being a uniformly curved display that completely encloses the object 252. However, in some implementations the display may extend around parts of the object, e.g., the front and side portions of an object. In addition, the display may take a variety of shapes. For example, in some implementations the display 254 may include directional lighting elements that are fixed to a flexible backing, e.g., a vinyl sheet, that can be draped over an object. Using such techniques, the object 252 may be hidden from viewers approaching the object 252 from any direction.

Figure 2C:
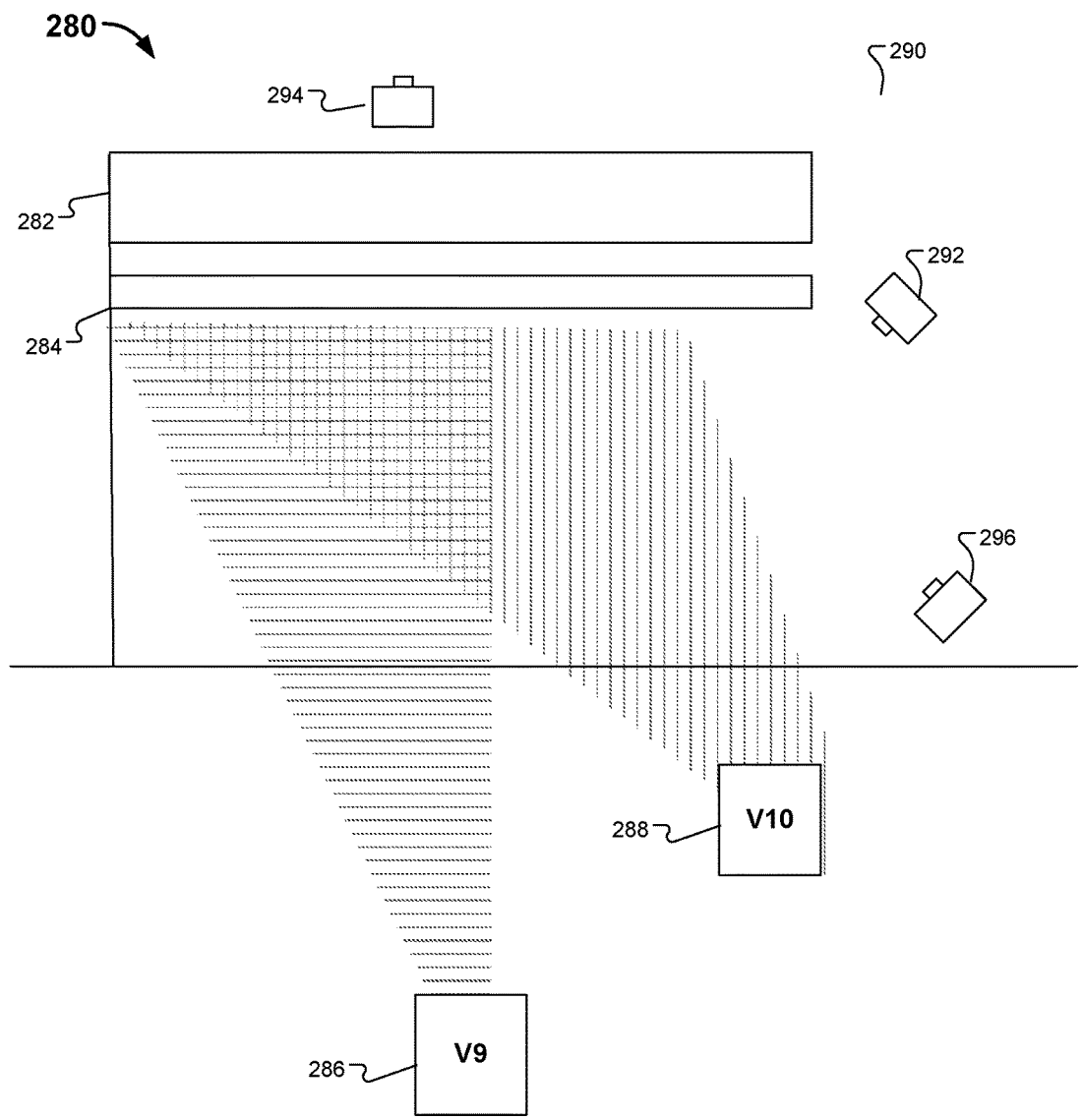
FIG. 2C depicts an example overhead view of a third environment that includes an multi-view display system.

FIG. 2C depicts an example view 280 of a third environment 290 that includes a multi-view display system. The example view 280 includes an object 282 that obstructs the view of portions of the environment 290 to viewers 286 and 288. A display 284 is located between the object 282 and the viewers 286 and 288. The example view 280 includes an observer sensor 292, an environment sensor 294, and a calibration camera 296. In some implementations the environment 290 may include more observer sensors, environment sensors or calibration cameras.

The object 282 shown in FIG. 2C represents an object that is located above an observer, e.g., on a ceiling. In some examples, the display 284 may be a display that is applied to the interior, e.g., the ceiling, of a room or of a moving vehicle such as a bus. In some instances, the display 284 may be on the exterior of a vehicle. The display may be configured to operate while in motion. Consequently, the system is configured to take into account the changing positions of users with respect to the display, and the changing positions of the display with respect to the background. As described above with reference to FIGS. 2A and 2B, the display 284 is configured to show images that blend the appearance of the display 284 with the environment 290, e.g., using the environment sensor 294 and the calibration camera 296.

The environment sensor 294 shown in FIG. 2C is positioned above the object 282. For example, the environment sensor 294 may be attached or mounted to the top of the object 282. Alternatively, the environment sensor 294 may be a mobile sensor, e.g., a sensor mounted or attached to a drone. In some implementations the position of the environment sensor 294 may vary. As described above with reference to FIG. 2B, the number and position of the environment sensors is dependent on properties of the object 282, e.g., the shape of the object 282, the type of sensor used, e.g., whether the sensor has a fixed field of view or a variable field of view, and the shape of the display, e.g., whether the display encloses the object 282 or not.

The calibration camera 296 shown in FIG. 2C is positioned below the object 282 and the display 284. For example, in cases where the object 282 is stationary, e.g., a floating object such as a balloon or a fixed object like a ceiling, the calibration camera 296 may be positioned on the ground at a fixed location. As another example, in cases where the object 282 is moving, e.g., the roof of a bus, the calibration camera 296 may be mobile, e.g., mounted to the moving object 282, or attached to a drone or other vehicle. As described above with reference to FIG. 2C, the number and position of calibration cameras is dependent on the type of sensor used, e.g., whether the sensor has a fixed field of view or a variable field of view, and the shape and location of the display.

The observer sensor 292 shown in FIG. 2C is positioned behind the object 282. For example, the observer sensor 292 may be a sensor that is mounted or attached to a drone that follows and/or circles the object 282. Alternatively, the observer sensor 292 may be included within the display 284 itself. In some implementations multiple observer sensors 292 may be used, e.g., the system may include multiple drones carrying respective observer sensors that each fly some distance from the object 282.

As described above with reference to FIG. 2A, the display 284 is configured to concurrently show different images that are each directed to a respective viewer, e.g., viewer 286 or viewer 288, of the display 284, e.g., using directional lighting elements. The images may be configured to enable the object 282, e.g., the roof of a bus or ceiling of a room, effectively disappear against the sky. In some implementations the display 284 may concurrently display synthetic information, e.g., augmented reality elements. For example, the display 284 may display an image that blends the display with the environment, e.g., the sky, and that shows objects flying through the sky, e.g., a flying dragon. In some cases the image may include advertisements that are targeted to one or more viewers of the display, as described below with reference to FIG. 4. In some cases the image shown on the display may vary in quality—for example, a viewer of the display that has subscribed to the service provided by the display or that has paid a premium subscription fee may be shown high quality images, whereas a viewer who has not subscribed to the service or who has paid a minimal subscription fee may be shown a low quality image.

In some implementations the display 284 may be configured to concurrently show different images that are each directed to respective groups of viewers. For example, the multi-view display system may be configured to identify groups of people, e.g., using an observer sensor, or hypothesized groups of people based on information relating to where people are typically likely to congregate, and to generate an image that may be directed to the group of people. In some cases the multi-view display system may optimize the use of computational resources required by the system by prioritizing groups of people, e.g., based on size of group, and showing highly prioritized groups a higher quality image than low prioritized groups.

Figure 3A:
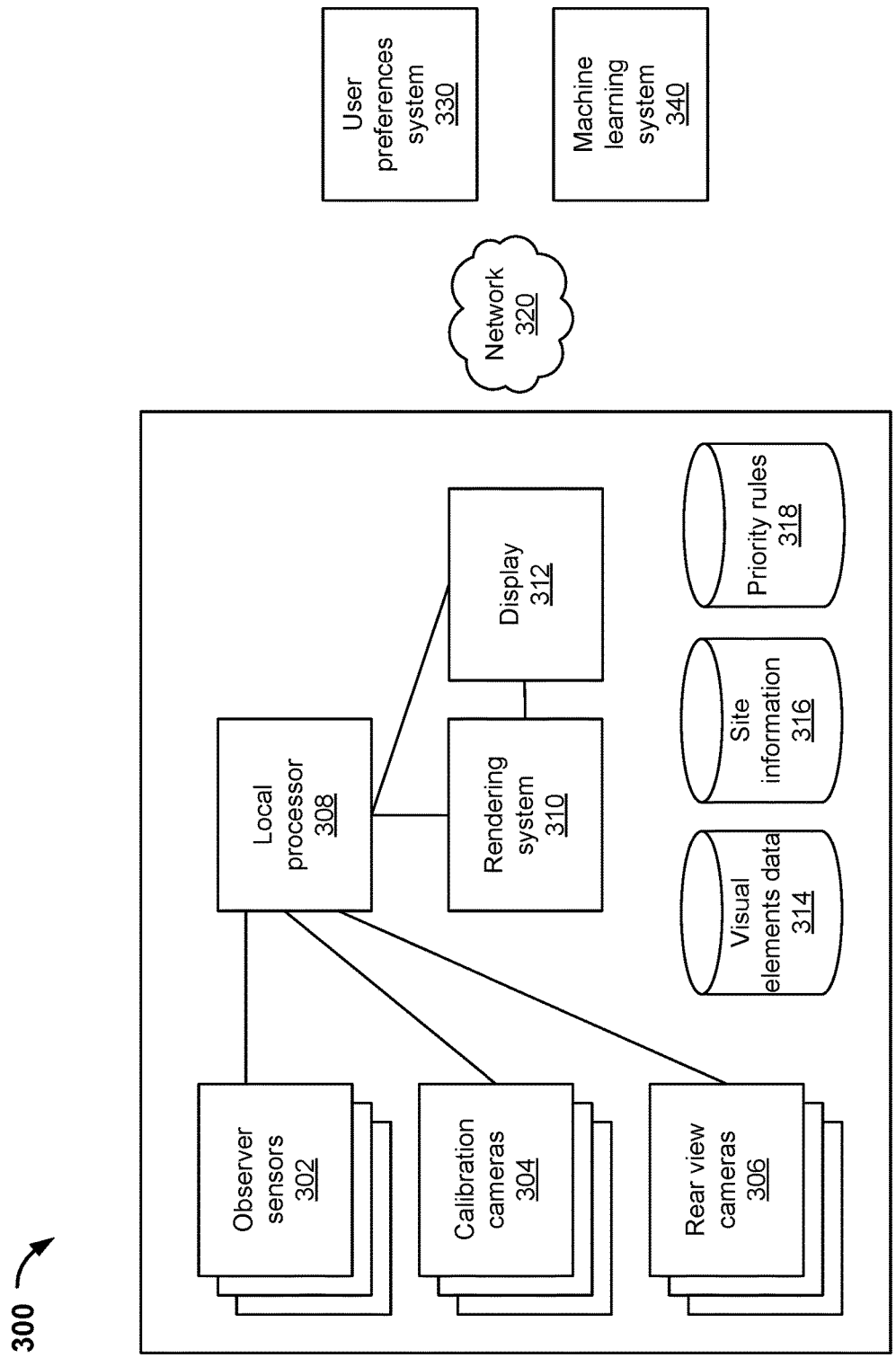
FIG. 3A depicts an example system for displaying an image on a display directed to an observer.

FIG. 3A depicts an example system 300 for displaying an image on a display directed to an observer. The system 300 includes observer sensors 302, calibration cameras 304, environment cameras 306, local processor 308, rendering system 310 and display 312. The rendering system 310 may communicate with one or more databases, e.g., a visual elements database 314, site information data database 316 or priority rule database 318. Optionally, the system 300 may further include a user preference system 330 and a machine learning system 340. In some implementations, a network 320, such as a local area network (LAN), wide area network (WAN), the internet, or a combination thereof, connects one or more of the components of the system 300.

The observer sensors 302 include one or more devices capable of detecting observers of the display 312, e.g., people located within an environment of the display 312. For example, the observer sensors 302 may include one or more of video cameras, stereo-cameras, lidar, Tango-type units, radar, magnetic sensors, radio frequency signal detectors, reflective sound imagers or other sensors. In some implementation the observer sensors 302 may be mobile sensors, e.g., cameras mounted on drones or other moving objects. Each of the observer sensors 302 may further include an eye-tracking system that is configured to identify a gaze direction of an observer of the display 312. For example, an observer sensor may detect an observer of the display 312 and in response to detecting the observer, determine a gaze direction of the observer. In other examples detecting observers of the display 312 may automatically include identifying eye gaze directions of observers of the display 312.

In some implementations the observer sensors 302 may be integrated with the display 312. In other implementations, as depicted in FIG. 3A, the observer sensors 302 may be separate units. For example, the observers sensors 302 may be positioned within the environment of the display 312 so as to monitor a space of potential motion paths of possible observers, e.g., in an area towards the front and sides of the display 204 described above with reference to FIG. 2.

In some implementations, the observer sensors 302 may include features that improve or assist functionality in poor lighting conditions, e.g., at night or during bad weather. For example, in some cases the observer sensors 302 may include additional lighting or infrared lighting features.

The calibration cameras 304 include one or more devices capable of gathering image data from the front of the display 312, e.g., the edges of the display 312 and an adjacent view of the environment in which the display 312 is located. For example, the calibration cameras 304 may include one or more video cameras directed at the display 312. The number of calibration cameras 304 included in the system 300 is dependent on the particular implementation in which the system is used—in some cases the system may require several calibration cameras 304 in order to be able to gather image data from each edge of the display 312.

The environment cameras 306 include one or more devices capable of gathering image data from behind an object occluded by the display 312. For example, the environment cameras 306 may include one or more video cameras located behind the object occluded by the display 312 and positioned toward an area of the environment that is occluded by the display 312 and the object occluded by the display, e.g., located behind the object 102 and positioned toward the area behind the stage as described above with reference to FIGS. 1A-1B. As another example, the environment cameras 306 may be integrated with the display 312, e.g., in settings where the display covers or is wrapped around the object.

The number of environment cameras 306 included in the system 300 is dependent on the particular implementation in which the system is used—in some cases the system may require several environment cameras 306 in order to be able to reconstruct an image representing the area behind the occluded object. In some implementations the environment cameras 306 may include multiple environment cameras that are positioned at different locations, i.e., have different viewing axes, and that have overlapping fields of view. In some implementations, one or more of the environment cameras 306 may have high dynamic range.

The local processor 308 may be configured to receive, store or process data received from the observer sensors 302, calibration cameras 304 and environment cameras 306. For example, the local processor 308 may be a computing device, such as a server. In some implementations, the local processor 308 may be configured to receive data from the observer sensors 302 and determine positions of observers that have been detected by the sensors. Furthermore, the local processor 308 may be configured to receive data from the observer sensors 302 and determine eye gaze directions of detected observers with respect to the display 312.

The rendering system 310 may be configured to generate, based at least on a determined gaze direction of a respective observer, an image that blends the appearance of the display 312 with the environment of the display 312. For example, as described above, the rendering system 310 may generate an image that is configured to blend an appearance of the display 312 with the environment of the display by using data representing images taken by the calibration cameras 304. For example, the rendering system 310 may use the data to ensure that the outer edges of a generated image matches the adjacent view of the environment, e.g., that a shade of a portion of grass shown in an edge of a generated image matches the shade of grass adjacent to the display, so that the display 312 is not perceived to have a hard edge or border and blends with the environment.

The image generated by the rendering system 310 may provide a view of the scene behind the occluded object from the perspective of the respective observer. For example, in cases where the object disturbs or spoils a particular view or scene, the rendering system 310 may generate an image that, when displayed on the display 312, gives the impression that the object is invisible. In other examples, in cases where the object obstructs the view of other objects, the rendering system 310 may generate an image that, when displayed on the display 312, represents the other objects—including the size and direction in which they travel—as they would appear to the observer if the object was not there.

In cases where the observer sensors 302 detect the presence of multiple possible observers, the rendering system 310 may be configured to generate multiple images that can concurrently be displayed on the display 312 directed to respective observers. Each generated image may be configured to provide a view to a respective observer that blends (i) an appearance of the multi-view display from a perspective of the observer with (ii) an appearance of the environment of the multi-view display from the perspective of the observer.

In these cases, the number of images generated by the rendering system 310 may depend on the gaze directions of each of the multiple possible observers. For example, the rendering system 310 may filter a detected number of observers based on determined eye gaze directions of the observers, e.g., by selecting a subset of the multiple observers. The rendering system 310 may select a subset of observers by assigning the multiple observers priority scores using one or more priority rules, where a priority score represents how important it is that a respective observer be shown an image that blends the appearance of the display 312 with the environment of the display from their perspective. For example, the rendering system 310 may access priority rules stored in a priority rule database 318 to generate a priority score for a detected observer.

In some implementations, priority rules included in the priority rules database 318 may include rules that prioritize a priority of one observer over another. For example, a priority rule in the priority rule database 318 may indicate that an observer who is closer to the display 312 has a higher priority than an observer who is further away from the display. Other priority rules in the priority rule database 318 may be based on a number of observers at a given viewing location, the observers' position, attentiveness to the display 312 or demographics associated with the observers. Assigning priority scores to observers and selecting a subset of observers based on determined eye gaze directions is described in more detail below with reference to FIG. 6.

The rendering system 310 may be configured to determine a distance between an observer and the display 312. For example, the rendering system 310 may receive data identifying a location of the observer from the local processor 306 or directly from the observer sensors 302. The rendering system 310 may use the data identifying the location of the observer to determine a distance between the observer and the display 312. For example, the rendering system 310 may determine a location of the display 312, e.g., by accessing site information data stored in the site information database 316, and use data identifying the location of the display 312 and the data identifying a location of the observer to determine a distance between the observer and the display 312.

The rendering system 310 may use a determined distance between an observer and the display 312 to generate an image based on (i) a determined gaze direction of the observer, and (ii) a determined distance between the observer and the display. For example, the rendering system 310 may determine that an observer is looking in the direction of the display 312, but that they are a significant distance away from the display 312. In this case the rendering system 310 may generate a low-fidelity image to display on the display 312. As another example, the rendering system 310 may determine that an observer is close to the display 312 but is not looking in a direction directly towards the display 312. In this case the rendering system may also generate a low-fidelity image to display on the display 312. As a further example, the rendering system 310 may determine that an observer is close to the display 312 and is looking in a direction towards the display 312. In this case the system may generate a high-fidelity image to display on the display 312. Generating images based on a gaze direction of an observer and a distance between the observer and a display is described in more detail below with reference to FIG. 4.

The rendering system 310 may be configured to determine a position of an observer relative to the display 312. For example, the rendering system 310 may receive data identifying a location of the observer from the local processor 306 or directly from the observer sensors 302. The rendering system 310 may use the data identifying the location of the observer to determine a position of the observer. In some cases the rendering system 310 may further identify the position of objects in the environment that are close to the position of the observer, e.g., trees, fences, walls or other buildings. The rending system 310 may identify such objects by accessing site information data stored in the site information database 316. For example, the site information database may include a three-dimensional map of the environment in which the display is located.

The rendering system 310 may use a determined position of an observer and determined positions of other objects to generate an image based on (i) the determined gaze direction of the observer, and (ii) the determined position of the observer. For example, the rendering system 310 may determine that an observer is looking in the direction of the display 312, but that they are currently positioned in front of a tree or other object that is blocking their view of the display 312. In this case the rendering system 310 may be configured to generate a blank image or display a default image on the display, since the observer cannot see the display.

The rendering system 310 may be configured to determine a measure of attentiveness of an observer to the display 312. The measure of attentiveness of an observer is indicative of a likelihood that the observer is actively looking at the display 312. For example, the rendering system 310 may use data received from the observer sensors 302 to determine whether an observer has been looking in a direction towards the display 312 for a significant amount of time, e.g., several seconds, or whether an observer regularly looks in a direction towards the display 312, e.g., every second or two. In these case the rendering system 310 may determine a measure of attentiveness that indicates that it is highly likely that the observer is looking at the display 312. Determining a measure of observer attentiveness is described in more detail below with reference to FIG. 4.

The rendering system 310 may use a determined measure of observer attentiveness to generate an image based on (i) a detected eye direction of an observer, and (ii) a determined measure of attentiveness. For example, in response to determining a low measure of attentiveness, the rendering system 310 may generate a low-fidelity or blank image to display on the display. In response to determining a high measure of attentiveness, the rendering system 310 may generate a high-fidelity image to display on the display.

The rendering system 310 may be configured to determine whether observers of the display 312 have subscribed to the service provided by the display or requested that the display 312 show them images, e.g., according to their preferences. For example, the rendering system 310 may communicated with a user preference system 330 using network 320 and may query the user preference system 330 using data obtained by the one or more observer sensors 302 to determine user preferences associated with the observer. In some cases identified user preferences may include information describing a type of content that a user has requested to see, or preferences for when and if they would like to see certain content. For example, a user may request to be shown images when they are in a park setting, since they may enjoy uninterrupted views of the landscape. As another example, a user may request to be shown images that include augmented reality aspects during the afternoons, if it is likely that they will be with their children in the afternoon who might enjoy such augmented reality aspects. As a further example, a user may request that they would prefer not to be shown advertisements, or request that only a particular type of advertisements are shown to them.

The rendering system may use determined user preferences to generate an image based on (i) a detected eye direction of the observer, and (ii) the user preferences. For example, the rendering system 310 may determine that the user has subscribed to the service provided by the display 312, and therefore generate a high-fidelity image to show on the display. Alternatively, the rendering system 310 may determine that the user has not subscribed to the service, and may not generate an image to show on the display 312.

In some cases the rendering system 310 may be configured to generate augmented images to show on the display 312, e.g., using information extracted from the user preferences. For example, in cases where the environment in which the display 312 is located is a park, the rendering system 310 may determine that the user has requested to be shown images relating to wildlife, e.g., birds. The rendering system 310 may then generate an image to show on the display 312 that includes one or more birds. Generating augmented images to show on display 312 is described in more detail below with reference to FIG. 4.

In some cases the rendering system 310 may be configured to generate simplified images to show on the display 312. For example, the rendering system 310 may remove any high frequency patterns on objects in an image, or may filter objects shown in the image based on a measure of relevance. For example, if the image shows a landscape scene, the rendering system 310 may generate an image that does not include fine grained details, e.g., a bee flying through the air or mole hills that appear on the ground. As another example, if the scene represents a road scene, the rendering system 310 may generate an image that only includes details relating to vehicles on the road or to pedestrians on the pavement, e.g., not including details of stationary objects such as trashcans or benches that are located on the pavement.

The rendering system 310 may be configured to generate an image based on a determined gaze direction of an observer by applying machine learning techniques to generate one or more portions of the image. For example, the rendering system 310 may communicate over network 320 with machine learning system 340 in order to generate an image.

As described above, in some cases the system 300 may use one or more calibration cameras 304 to obtain data representing images that include at least a portion of the display 312 and an adjacent view of the environment in which the display is located. This data may be used to blend an image shown on the display 312 with the environment. In some cases this data may be incomplete, e.g., due to faults with one or more of the cameras or due to objects blocking the camera's field of view. In these cases the machine learning system 340 may be used by the system 300 to complete the data and enable the system to generate an image that blends with the environment. In some cases the machine learning system 340 may include a neural network, e.g., a deep convolutional neural network, that has been trained on training data to generate images or new image information. The neural network may then be used to create synthetic image information to display on the display 312 that complements the calibration information around the edge of the display.

The rendering system 310 may be configured to transfer information to the display 312 that represents generated images that are configured to blend an appearance of the display 312 with the environment of the display. In some implementations, the rendering system 310 may communicate directly with the display 312. In other implementations the rendering system 310 may transfer information to the display 312 via local processor 308.

The display 312 displays received images that are configured to blend an appearance of the display 312 with the environment of the display. The display 312 occludes an object and may be located between occluded object and detected observers. For example, the display 312 may be draped over or otherwise attached to the object itself. In some implementations the object may be the display itself, e.g., in cases where the purpose of the display is to show images that include augmented reality elements, or the display may be mounted on or intrinsic to the surface of the object.

In some implementations, the display 312 has an arrangement of pixels, where the light output of each pixel has a controllable directionality. For example, the display 312 can be a directional multi-view display. The display 312 may include an array of refractive microstructures, e.g., diverting lenses, aligned to the array of pixels. In some implementations the display 312 may include a reflective, transflective, transmissive, or emissive display. For example, the display 312 may include a conventional display architecture, such as an LCD (liquid crystal display), OLED (organic LED), or LED array, or a rear-projection screen with an image projection element situated behind it. Each pixel of the display 312 may comprise multiple subpixels, each of which might correspond to a different angular range of light output. For example, while a single spatial pixel in a conventional LED array may include three LED dice (one red, one green, and one blue), a directional display might have, for example, a 144-die array of LED dice (3 colours, RGB, ×4 vertical angle ranges, ×12 horizontal angle ranges). Depending on the anticipated viewing distance, the size of each full pixel may be quite large, e.g., ~10 cm, or very small, e.g., ~1 mm. Alternately, a small number of physical subpixels, e.g., 3 as above, may be augmented by a switchable beam steering device to provide angular output in a time-sequential manner. The switchable beam device may be a liquid-crystal based device that refractively steers the light, or an MEMS device that mechanically adjusts mirrors that steer the light.

Figure 3B:
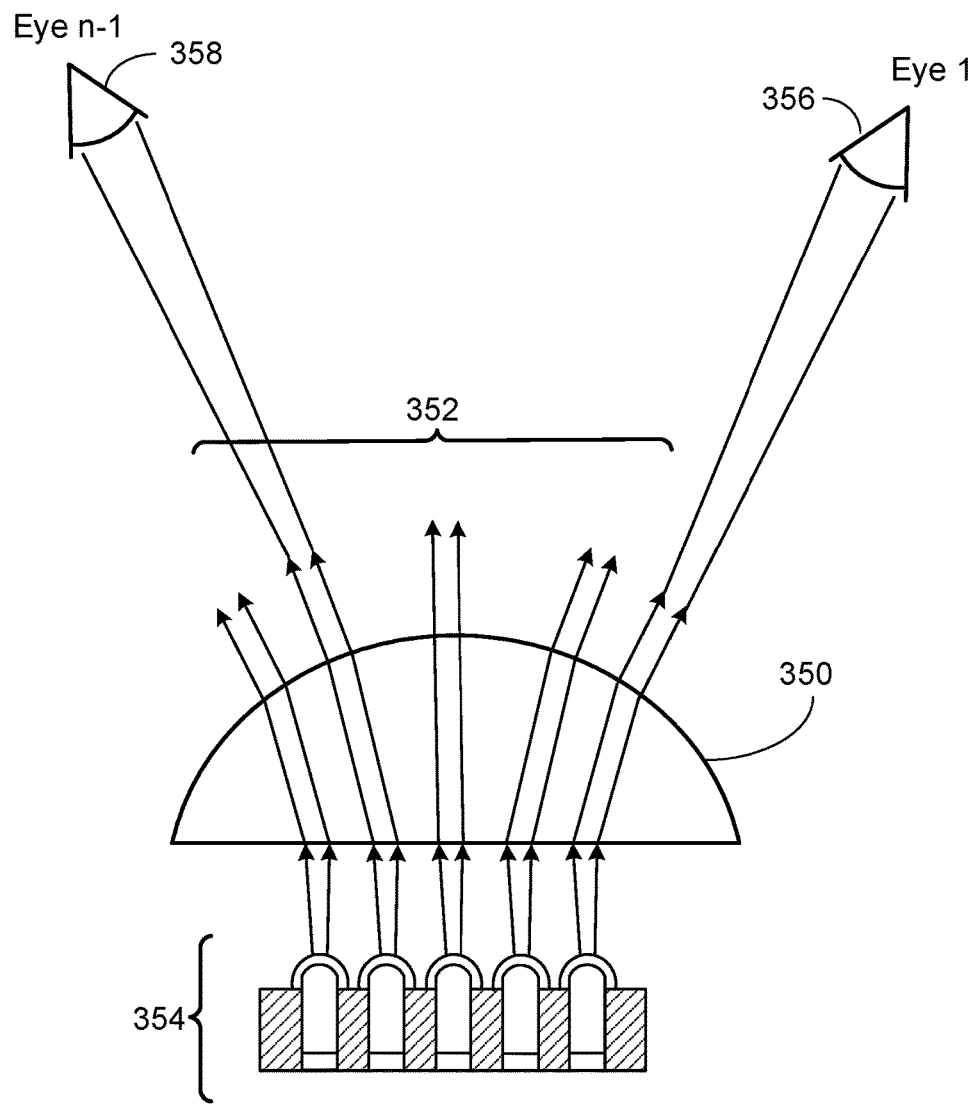
FIG. 3B depicts an example refractive microstructure.

An example refractive microstructure is shown in FIG. 3B. The example refractive microstructure 350 is aligned to a single pixel 352. An associated array of subpixels 354 lies behind the microstructure 350. Each subpixel in the array of subpixels 354 is configured to provide somewhat collimated light. For example, the subpixels may be represented using an LED or other light element.

Each pixel in the array of pixels may be associated with a microlens and/or absorbing element that collimates received light prior to the light hitting the corresponding refractive microstructure, e.g., microstructure 350. The refractive microstructure 350 then directs information to a specific output angle of the appropriately rendered image that corresponds to the observer's location, e.g., to observer 356 or observer 358.

Figure 4:
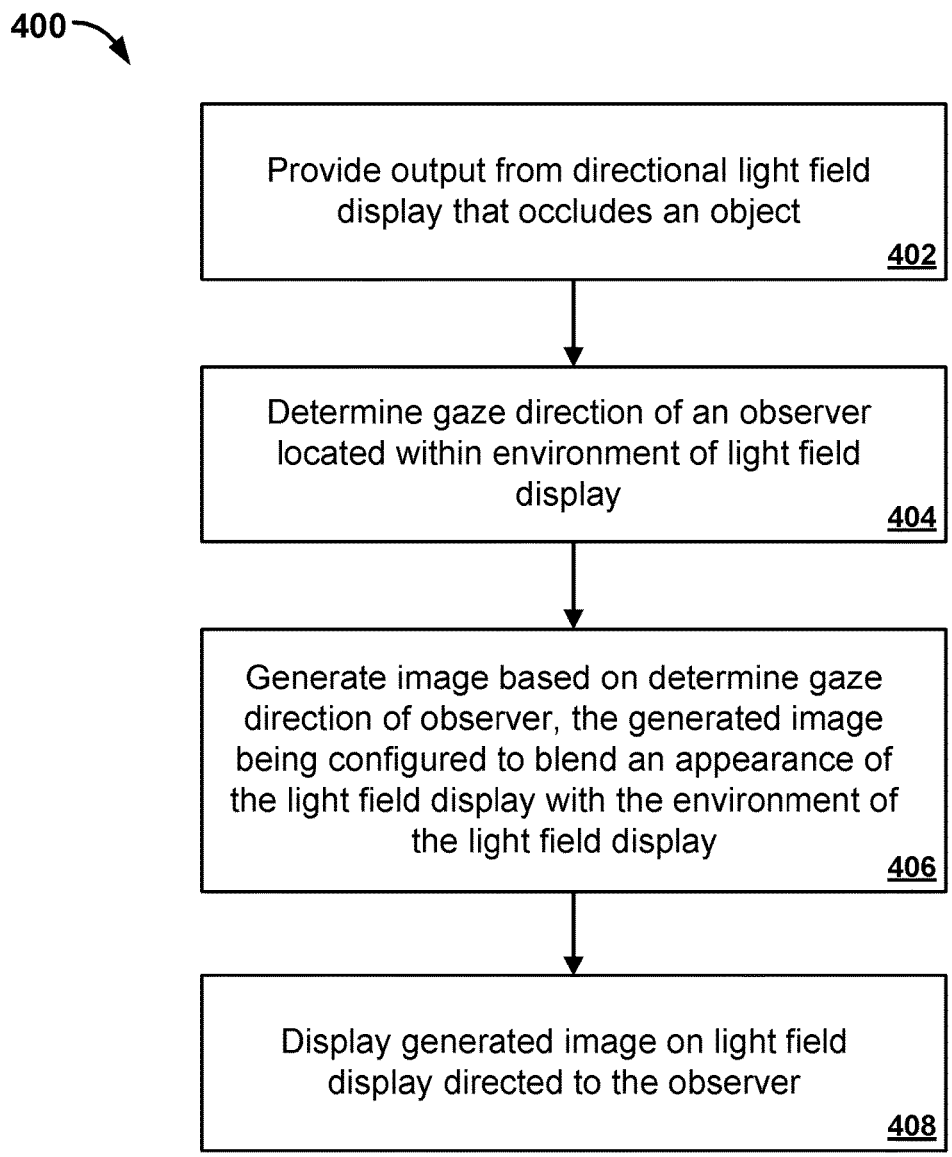
FIG. 4 is a flowchart of an example process for displaying an image on a display directed to an observer.

FIG. 4 presents an example process 400 for displaying an image on a multi-view display directed to an observer. For convenience, the process 400 will be described as being performed by a system including one or more computers located in one or more locations. For example, a system for displaying an image on a multi-view display directed to an observer, e.g., the multi-view display system 300 of FIGS. 3A and 3B, appropriately programmed, can perform the process 400.

The system provides output from a directional multi-view display that occludes an object (step 402). For example, as illustrated above with reference to FIGS. 1A-1B, the system may provide output from a directional multi-view display located in a park that occludes a temporary or permanent structure. As another example, the system may provide output from a directional multi-view display located in a theatre that occludes a wall blocking a portion of the theatre stage. As a further example, the system may provide output from the directional multi-view display located at an intersection that occludes a building on the corner of the intersection. The output provided by the directional multi-view display may be a default output, such as an energy efficient, low resource output.

The system determines a gaze direction of an observer located within an environment of the multi-view display (step 404). For example, as described above with reference to FIG. 3A, the system may include one or more observer sensors located in the environment that detect the presence of a potential observer of the display. In response to detecting a potential observer of the display, the system may determine a gaze direction of the observer, e.g., using an eye-tracking system.

In some implementations multiple observers in close proximity to one another may be located within the environment, e.g., a group of people. In these cases the system may determine a gaze direction of one of the observers, i.e., the system may treat the group of observers as a single unit and determine a gaze direction of a representative observer from the group.

In some implementations the system may further determine respective gaze directions of multiple observers located at different locations with respect to the multi-view display. For example, in some cases, e.g., public spaces or crowded areas, the system may determine the presence of multiple potential observers of the display. In these cases the system may select a subset of the potential observers and determine respective gaze directions of the observers in the subset. Determining respective gaze directions of multiple observers located at different locations with respect to the multi-view display is described in more detail below with reference to FIG. 6.

In some implementations, the system may further determine a distance between the observer and the display. For example, the system may determine a location of the observer using one or more sensors located in the environment. Based on the determined location, and information about the location of the display, the system may determine a distance between the observer and the display. In cases where the system determines respective gaze directions of multiple observers located at different locations with respect to the multi-view display, the system may further determine respective distances between each observer and the display.

In some implementations, the system may further determine a position of the observer relative to the display. For example, as described above, the system may use one or more sensors located in the environment to determine a location of the observer. In cases where the system determines respective gaze directions of multiple observers located at different locations with respect to the multi-view display, the system may further determine respective positions of each observer relative to the display.

In some implementations, the system may further determine a measure of attentiveness of the observer to the multi-view display. The measure of attentiveness is indicative of a likelihood that the observer is actively looking at the display. For example, the system may use one or more sensors in the environment to determine that an observer has been looking in a direction towards the display for a significant amount of time, e.g., several seconds. As another example, the system may use one or more sensors in the environment to determine that an observer regularly looks in a direction towards the display, e.g., every second or two. In this case the system may determine a measure of attentiveness that indicates that it is highly likely that the observer is looking at the display.

As another example, the system may use one or more sensors in the environment to determine that an observer has been looking in a direction away from the display for a significant amount of time, e.g., several seconds. As a further example, the system may use one or more sensors in the environment to determine that an observer is talking on their telephone and making hand gestures. As a further example, the system may use one or more sensors in the environment to determine that an observer is part of a group of people, e.g., playing football or engaging in conversation. In these cases the system may determine a measure of attentiveness that indicates that it is not likely that the observer is looking at the display.

In cases where the system determines respective gaze directions of multiple observers located at different locations with respect to the multi-view display, the system may further determine a respective measure of attentiveness of each observer to the display.

In some implementations observer preferences may be determined. For example, the system may detect the presence of an observer by detecting the presence of a device associated with the observer, e.g., a mobile phone. The observer device may be configured to send a device identifier or observer account identifier to the multi-view display system. The system may then use the received device identifier or observer account identifier to determine observer preferences or information associated with the observer. In other implementations an exact location of the observer, e.g., in GPS coordinates, may be determined by detecting the presence of a device associated with the observer. For example, the system may receive GPS coordinates from the observer device. In cases where the system determines respective gaze directions of multiple observers located at different locations with respect to the multi-view display, respective preferences or locations of each of the multiple observers may be determined.

The system generates an image based on the determined gaze direction of the observer (step 406). In some implementations the system may further generate multiple images based on the gaze directions of each of multiple observers. For example, as described above with reference to step 404, in some cases the system may determine respective gaze directions of multiple observers located at different locations with respect to the multi-view display. In these cases the system may further generate multiple images, where each generated image is based on a respective determined gaze direction of one of the multiple observers.

As described above with reference to step (404), in some cases the system may determine a gaze direction of a representative observer from a group of observers who are in close proximity to one another. In these cases the system may generate an image based on the determined gaze direction of the representative observer, or may generate an image based on a determined gaze direction that is based on the entire group rather than a specific gaze direction, e.g., the gaze direction of the representative observer.

The generated image is configured to blend an appearance of the multi-view display with the environment of the multi-view display. For example, the system may generate an image that, when displayed on the multi-view display, provides a smooth transition from the edges of the image to the environment. The display may then not be perceived to have a hard edge or border. In some implementations the system generates an image that is configured to blend an appearance of the multi-view display with the environment of the multi-view display by using data representing images taken by from one or more cameras directed toward the multi-view display to capture an image that includes at least a portion of the multi-view display and an adjacent view of the environment.

In some implementations the system may use information from multiple cameras and interpolate based on a position of observers within the environment relative to the cameras. The system may then display an image representing a visual space directly adjacent to the display from the observer's perspective. Additionally, the system may determine a gradient of real-world image content near the borders of the image. This information may represent a set of perimeter boundary conditions that determine what the outermost set of pixels should be from the observer's perspective. In the case of a curved convex display, the boundary information may be applied to the visual extrema of the display as perceived by the observer.

For example, in some cases a smooth transition from the edges of the image to the environment may be achieved by ensuring that colours that span the edge of the image and the environment of the multi-view display appear continuous, e.g., that a shade of a portion of grass shown in an edge of an image on the display matches the shade of grass adjacent to the display. In this case the system may use obtained data representing images of a portion of the multi-view display and an adjacent view of the environment to identify colours of the adjacent view of the environment, and use the identified colours when generating the edge portions of the image.

As another example, in some cases a smooth transition from the edges of the image to the environment may be achieved by ensuring that light intensities that span the edge of the image and the environment of the multi-view display appear continuous. In this case the system may use obtained data representing images of a portion of the multi-view display and an adjacent view of the environment to identify light intensities of the adjacent view of the environment, and use the identified light intensities when generating the edge portions of the image.

As another example, in some cases a smooth transition from the edges of the image to the environment may be achieved by ensuring that lines or shapes that span the edge of the image and the environment of the multi-view display appear continuous, e.g., that a shape and thickness of a tree shown in an edge of an image on the display matches the shape and thickness of the tree as it appears adjacent to the display. In this case the system may use obtained data representing images of a portion of the multi-view display and an adjacent view of the environment to identify lines or shapes that appear in the adjacent view of the environment, and use the identified lines or shapes when generating the edge portions of the image.

As another example, in some cases a smooth transition from the edges of the image to the environment may be achieved by ensuring that the absolute color, hue, or brightness as well and their gradients of pixels that span the edge of the image and the environment appear continuous. For example, if the digitally reconstructed, interpolated visual content just beyond the left side of the display as perceived by the observer is medium blue, and slightly beyond that is a darker blue, the edge of the display may present a matched medium blue to pixels near the left edge of display, with the pixels just to the right of that as a slightly lighter blue In cases where the system generates multiple images, each generated image is configured to provide a view to a respective observer that blends (i) an appearance of the multi-view display from a perspective of the observer with (ii) an appearance of the environment of the multi-view display from the perspective of the observer.

In some implementations, the system generates an image that provides a view of the scene behind the occluded object from the perspective of the observer. For example, in cases where the object disturbs or spoils a particular view or scene, the system may generate an image that, when displayed on the display, gives the impression that the object is invisible. In other examples, in cases where the object obstructs the view of other objects, the system may generate an image that, when displayed on the display, represents the other objects—including the size and direction in which they travel—as they would appear to the viewer if the object was not there.

In some cases the system may augment the image representing the scene to include one or more added visual elements that are not in the environment of the multi-view display. For example, in cases where the object disturbs or spoils a particular view or scene, e.g., a portion of landscape, the system may augment the image to include one or more decorative elements to increase the aesthetics of the scene. Example decorative elements can include additional plants, animals or water fountains. As another example, in cases where the object obstructs the view of other objects, e.g., a building located at an intersection that blocks the view of incoming traffic, the system may augment the image to include warning signs or instructions. For example, the image may include the instruction "Yield" or may include flashing lights to emphasize a potential collision risk.

In some cases the system may generate an image that represents a simplified version of the scene. For example, the system may reduce computational power and resources required to generate and display an image on the display by removing any high frequency patterns on objects, or by filtering objects shown on the screen based on a measure of relevance. For example, if the scene is a landscape scene, the system may generate an image that does not include fine-grained details, e.g., a bee flying through the air or mole hills that appear on the ground. As another example, if the scene is a road scene, the system may generate an image that only includes details relating to vehicles on the road or to pedestrians on the pavement, e.g., not including details of stationary objects such as trashcans or benches that are located on the pavement.

As described above with reference to step 404, in some implementations, the system may further determine a distance between the observer and the display. In these implementations the system may generate an image based on (i) the determined gaze direction of the observer, and (ii) the determined distance of the observer. For example, the system may determine that an observer is looking in the direction of the display, but that they are a significant distance away from the display. In this case the system may generate a low-fidelity image to display on the display. As another example, the system may determine that an observer is close to the display but is not looking in a direction directly towards the display, e.g., in a direction perpendicular to the display. In this case the system may also generate a low-fidelity image to display on the display. As a further example, the system may determine that an observer is close to the display and is looking in a direction towards the display. In this case the system may generate a high-fidelity image to display on the display. Example low-fidelity and high-fidelity images are shown below with reference to FIGS. 5A and 5B.

As described above with reference to step 404, in some implementations, the system may further determine a position of the observer relative to the display. In these implementations, the system may generate an image based on (i) the determined gaze direction of the observer, and (ii) the determined position of the observer. For example, the system may determine that an observer is looking in the direction of the display, but that they are currently positioned in front of a tree or other object that blocks their view of the display, e.g., using obtained information about the environment in which the display is located. In this case the system may generate a blank image or display a default image on the display, since the observer cannot see the display.

As described above with reference to step 404, in some implementations, the system may further determine a measure of attentiveness of the observer to the multi-view display. In these implementations, the system may generate an image based on (i) a detected eye direction of the observer, and (ii) the determined measure of attentiveness. For example, the system may monitor an observer to determine that the observer is currently engaged with their phone, or in conversation with another observer. In this case the system may determine that the observer's level of attentiveness to the display is low, and may therefore generate a low-fidelity or blank image to display on the display. In other examples the system may monitor the observer to determine that the observer is engaged with the display, e.g., by determining that the observer has been looking in the direction of the display for an extended period of time or that the observer's gaze direction keeps returning to the direction of the display. In this case the system may determine that the observer's level of attentiveness to the display is high, and may therefore generate a high-fidelity image to display on the display.

As described above with reference to step 404, in some implementations, the system may further determine viewing preferences of the observer. In these implementations, the system may generate an image based on (i) a detected eye direction of the observer, and (ii) the user preferences. For example, the system may determine that the user has subscribed to the service provided by the display, and therefore generate a high-fidelity image to show on the display. In some implementations the image may include one or more advertisements, e.g., that are targeted to the used based on the determined user preferences, e.g., requests to be shown certain types of image content. Alternatively, the system may determine that the user has not subscribed to the service, and may not generate an image to show on the display.

In some cases information extracted from the user preferences may be used to augment the image shown on the display. For example, in cases where the environment in which the display is located is a park, the system may extract information that indicates that the observer has requested to be shown images that include wildlife, e.g., birds, or sport, e.g., football. The system may then generate an image to show on the display that includes one or more birds or a game of football. In cases where the system communications directly with a device associated with an observer, the system may generate an image to show on the display that enables the display to mirror items displayed on the observer device. For example, the generated image may include a replica of the image currently shown on the observer device. As another example, the system may use information from applications running on the observer device to generate an image that is personal to the observer, e.g., showing news headlines, video game elements, calendar appointments, received messages, incoming call alerts or advertisements.

In some implementations, the system may generate an image based on the determined gaze direction of the observer by applying machine learning techniques to generate one or more portions of the image.

For example, as described above with reference to FIG. 3A, in some cases the system may use data representing images taken by one or more cameras directed towards the display to capture an image that includes at least a portion of the display and an adjacent view of the environment. This data may be used to blend an image shown on the display with the environment. In some cases the data may be incomplete, e.g., due to faults with one or more of the cameras or due to objects blocking the camera's field of view. In these cases the system may use machine learning techniques to complete the data and enable the system to generate an image that blends with the environment. For example, the system may include a machine learning system that has been trained to perform pattern completion by generating content derived from training data to have characteristics of real-world images, as described above with reference to FIG. 3A. Then, as an example, in cases where the data does not include a top portion of the display where the display meets a blue skyline, the system may apply machine learning techniques to determine how to interpolate and represent the sky. Alternatively or in addition, the system may determine an appropriate colour to represent the sky using other information, e.g., time of day, current temperature or wind conditions.

The system displays the generated image on the multi-view display directed to the observer (step 408). In cases where the system determines respective gaze directions of multiple observers located at different locations with respect to the multi-view display and generates, for each of the multiple observers, an image based on the gaze direction of the observer, the system may concurrently display the generated images on the multi-view display, where each of the generated images is directed to the corresponding observer.

In some implementations the system may dynamically change the displayed image on the multi-view display as the determined gaze direction of the observer changes. For example, the system may use one or more observer sensors to track an observer and monitor their eye gaze direction at regular intervals of time, e.g., at an interval such as 5 ms, 10 ms, 20 ms, 1 s, 10 s or 1 minute. At each time interval, the system may generate an updated image that blends an appearance of the multi-view display with the environment of the multi-view display. In this manner, the image shown to observer changes through time and maintains a realistic view of the scene behind the occluded object from the changing perspective of the observer.

In cases where the system concurrently displays multiple generated images on the light display, where each of the generated images is directed to a corresponding observer, the system may dynamically change each displayed image on the multi-view display as the determined gaze direction of the corresponding observer changes, e.g., by concurrently monitoring the respective eye gaze directions of each observer at regular intervals of time.

In some implementations, the system may receive data indicating one or more interactions of the observer with a user device while in proximity to the multi-view display. In these cases, the system may generate and display an image based on (i) the determined gaze direction of the observer and (ii) the data indicating one or more interactions of the observer with a user device while in proximity to the multi-view display. For example, the system may receive data indicating that the observer is using his mobile phone to write a text message, make a call or browse the Internet. In this example the system may determine that the observer is not engaged with the display and may generate a default image to show on the display. As another example, the system may receive data indicating that the observer is looking up weather forecast information using his mobile phone. In this example the system may determine that the observer is interested in what the weather will be like tomorrow, and may generate an image representing the weather tomorrow. For example, in cases where the display is located in a park, this may include generating an image of the scene behind the object occluded by the display under the predicted weather conditions, e.g., a scene where it is raining. To avoid confusion the image may also include an indication that the image is showing a predicted weather forecast, e.g., by including the words "The weather tomorrow looks like this" or the like.

Figure 5A:
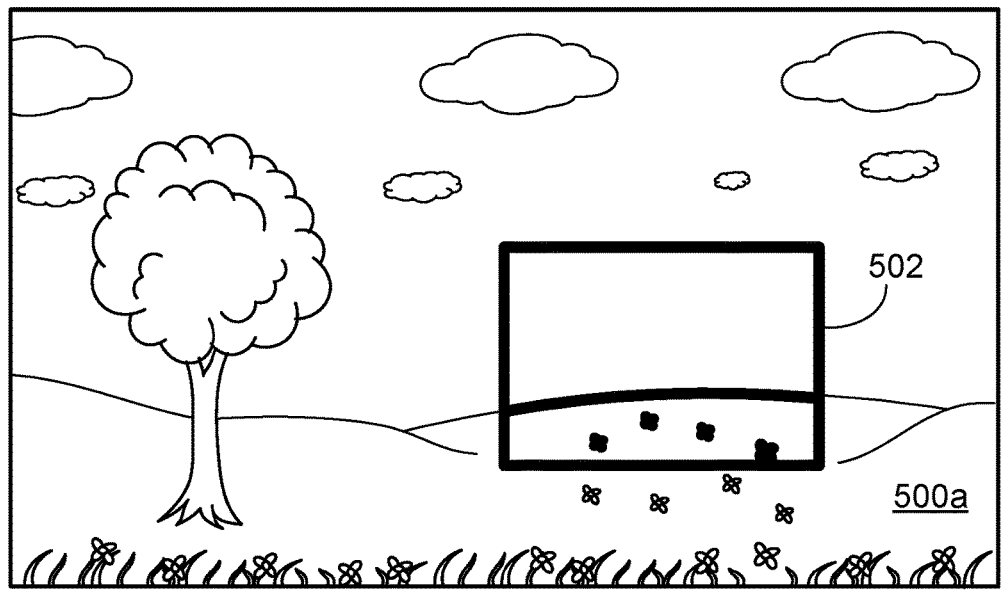
FIGS. 5A-5C illustrate example images for displaying on a display directed to an observer.
Figure 5B:
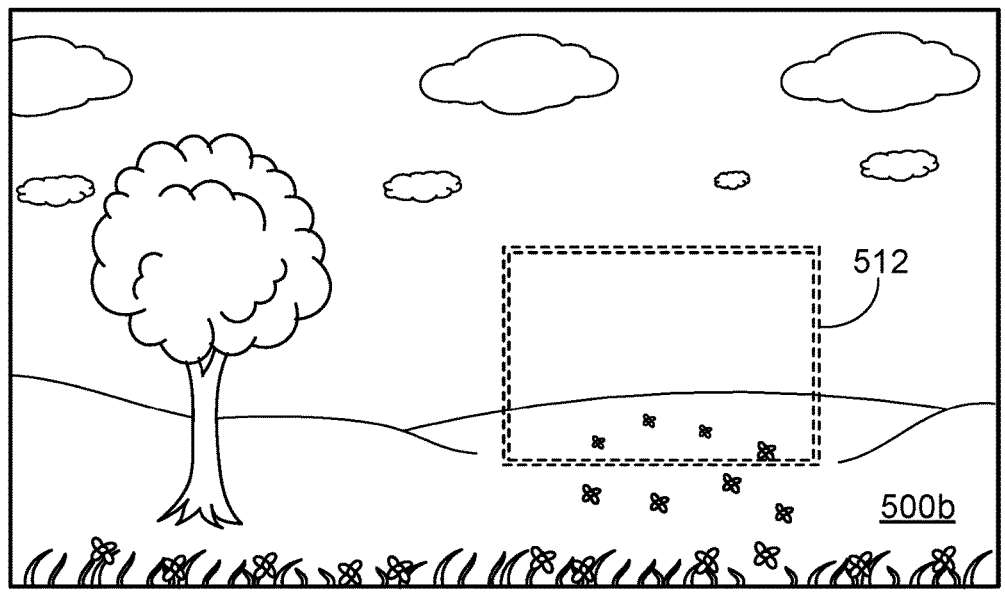
Figure 5C:
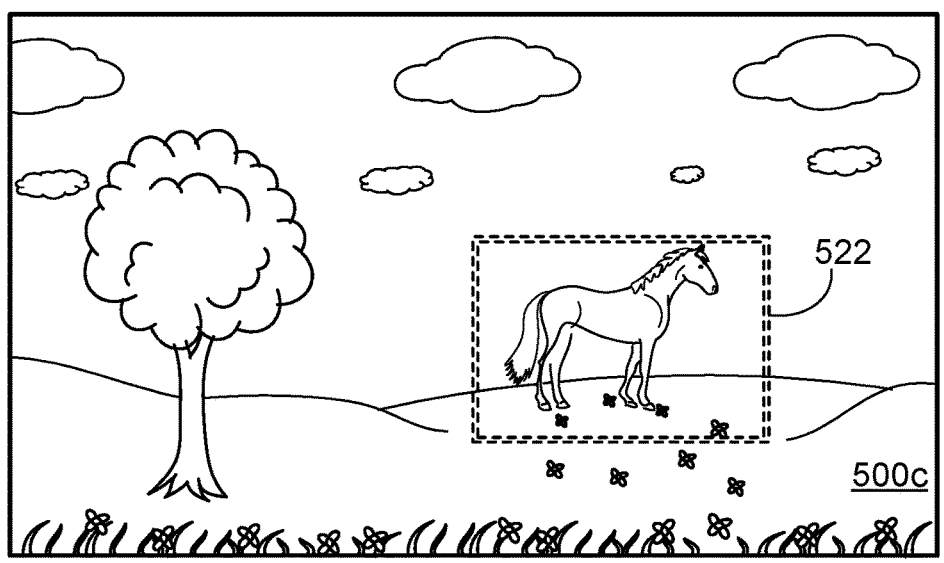

FIGS. 5A-5C illustrate example displays 500a-500c showing different images that blend an appearance of a multi-view display with an environment of the multi-view display. For example, a directional multi-view display, e.g., the display described above with reference to FIGS. 1-3, can show the different images. For clarity, the example displays 500a-500c represent images that blend an appearance of a multi-view display with an environment of the multi-view display at a fixed instance in time, as viewed by one observer. As described above with reference to FIG. 2, in some implementations, the example displays 500a-500c are dynamic displays and may show multiple images to respective multiple observers.

FIG. 5A illustrates an example display 500a showing an image 502 that blends an appearance of the display 500a with an environment of the display. For example, the image 502 may be an image of a park or landscape, as described above with reference to FIGS. 1A-1B. In this example, the view of the park or landscape shown in the image 502 may be occluded from observers by a temporary or permanent construction located in the park or landscape.

The image 502 shown by the display 500a may include a low-fidelity representation of the park or landscape. In some implementations, a display may be configured to show a low-fidelity image to save computational resources. For example, in cases where it is determined that an observer of the image 502 is far away from the screen, or that an observer of the image 502 is not looking directly at the display 500a, a system generating images to show on the display 500a may generate low-fidelity images. As another example, the low-fidelity representation of the park or landscape may include a simplified version of the park or landscape, e.g., a version that does not include high frequency patterns or fast moving objects.

In some implementations, a display may be configured to show a low-fidelity image due to economic considerations. For example, the resolution at which a display shows an image may depend on a resolution and dimensions of the display itself. In cases where the display includes an array of refractive microstructures, as described above with reference to FIGS. 3A-3B, the resolution of a shown image may depend on the number of refractive microstructures used.

The image 502 shown by the display 500a is rendered dynamically such that at any point in time, the image 502 blends an appearance of the display 500a with the environment of the display, as described above with reference to FIG. 4.

FIG. 5B illustrates an example display 500b showing an image 512 that blends an appearance of the display 500b with an environment of the display. For example, the image 512 may be an image of a park or landscape, as described above with reference to FIGS. 1A-1B. In this example, the view of the park or landscape shown in the image 512 may be occluded from observers by a temporary or permanent construction located in the park or landscape.

The image 512 shown by the display 500b may include a high-fidelity representation of the park or landscape. In some implementations, a display may be configured to show a high-fidelity image to increase an effectiveness of the image 512 blending an appearance of the display 500b with the environment of the display 500b. For example, in cases where it is determined that an observer of the image 512 is close to the screen, or that an observer of the image 512 is looking directly at the display 500b, a system generating images to show on the display 500b may generate high-fidelity images.

FIG. 5C illustrates an example display 500c showing an image 522 that blends an appearance of the display 500c with an environment of the display. For example, the image 522 may be an image of a park or landscape, as described above with reference to FIGS. 1A-1B. In this example, the view of the park or landscape shown in the image 522 may be occluded from observers by a temporary or permanent construction located in the park or landscape.

The image 522 shown by the display 500c may include an image that is based on the view of the park or landscape behind the object occluded by the display but has been augmented to include one or more visual elements. For example, the animals 524 grazing in the scene represented by image 522 may be decorative elements and not appear in the actual scene behind the object occluded by the display. As another example, the image 522 may represent an idealized version of the scene behind the object occluded by the display, e.g., by swapping patches of dead grass for lush green grass or by representing a water fountain as operating even if the actual water fountain is not operating. In some cases the image 522 may be augmented based on user preferences associated with an observer of the display, as described above with reference to FIG. 4.

Figure 6:
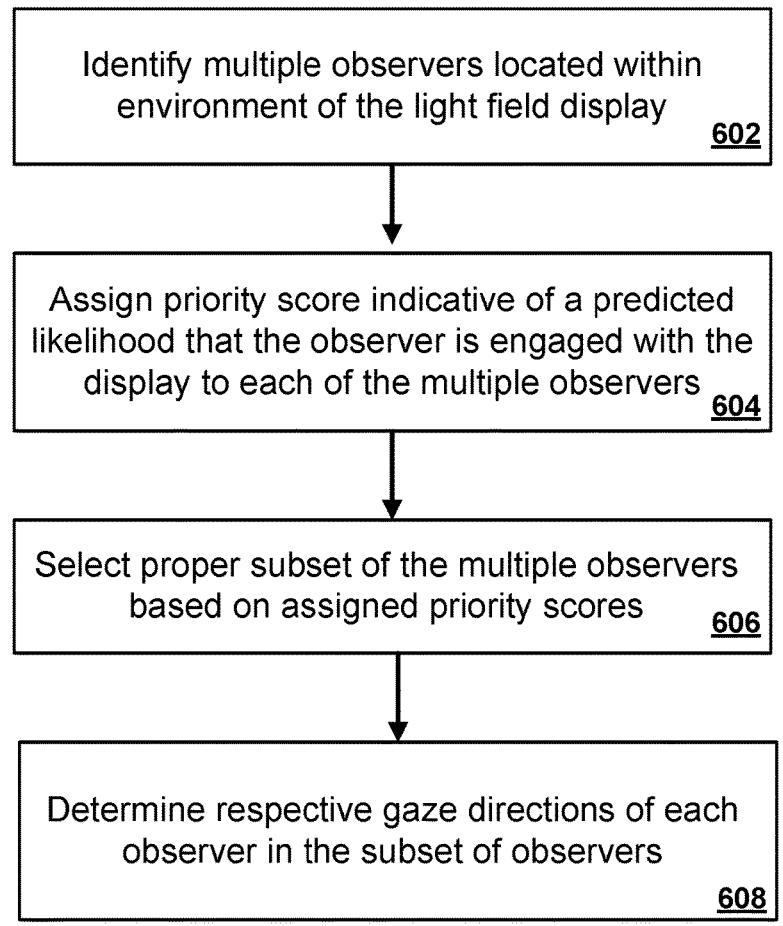
FIG. 6 is a flowchart of an example process for determining respective gaze directions of multiple observers located at different locations with respect to a display.

FIG. 6 presents an example process 600 for determining respective gaze directions of multiple observers located at different locations with respect to the multi-view display. For convenience, the process 600 will be described as being performed by a system of one or more computers located in one or more locations. For example, a system for displaying multiple images on a multi-view display directed to one or more observers, e.g., the multi-view display system 300 of FIGS. 3A-3B, appropriately programmed, can perform the process 600.

The system identifies multiple observers located within the environment of the multi-view display (step 602). For example, in some cases the environment of the multi-view display may be a crowded area or public space such as a park, intersection of roads in a city or a theatre. In this example, the system may use one or more observer sensors, as described above with reference to FIG. 3A, to detect people that are located within the environment of the multi-view display. For example, in cases where the multi-view display is located in an outdoor space, the system may identify one or more observers that are located within a predetermined distance from the multi-view display, e.g., within 200 m from the multi-view display, or one or more observers that are located within a predefined area of the outdoor space, e.g., a semi-circle extending from the middle of the display. In cases where the multi-view display is located at an intersection, the system may identify one or more observers that are located on a road in front of the multi-view display. In cases where the multi-view display is located in an indoor space, the system may identify one or more observers that are located in a predefined area of the indoor space, e.g., observers located in one or more predefined seats of a theatre.

The system assigns a priority score indicative of a predicted likelihood that the observer is engaged with the display to each of the multiple observers (step 604). In some implementations the system assigns the priority scores by assigning, for each of the one or more observers, a priority score based on one or more of (i) position of the observer, (ii) distance of observer from the display, (iii) information associated with preferences of the observer, or (iv) attentiveness of the observer to the display. For example, an observer who is located closer to the display may be assigned a higher priority score than an observer who is located further away from the display. As another example, an observer whose view of the display from their current position is not blocked by any other objects, e.g., trees, may be assigned a higher priority score than an observer whose view of the display from their current position is blocked by other objects. As another example, an observer who appears to be attentive to the display may be assigned a higher priority score than an observer who does not appear to be attentive to the display. As another example, an observer who has subscribed to the service provided by the display, i.e., has indicated that they wish to be shown images on the display, may be assigned a higher priority score than an observer who has not subscribed to the service provided by the display.

The system selects a proper subset of the multiple observers based on the assigned priority scores (step 606). In some implementations, the subset may be of a predetermined fixed size, e.g., the system selects a predetermined number of observers to include in the subset. For example, the system may select N observers who have been assigned the top N priority scores. In some implementations, the system may select a number of observers who have been assigned priority scores that exceed a predetermined priority score threshold.

The system determines respective gaze directions of each observer in the subset of observers (step 608). The system may use the determined respective gaze directions of the observers to generate images that are configured to blend an appearance of the multi-view display with the environment of the multi-view display from the respective perspectives of the observers in the subset of observers, as described above with reference to FIG. 4.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
providing output from a directional multi-view display that occludes an object, the multi-view display having a side comprising a display surface;
determining, for each of multiple observers located within an environment of the multi-view display, a gaze direction of the observer, wherein at least some of the multiple observers are determined to have a gaze direction that is toward the display surface;
determining, for each of the multiple observers, a priority score based at least in part on the gaze direction of the observer;
generating, for each of multiple observers determined to have a gaze direction that is toward the display surface, an image based on the determined gaze direction of the observer and the priority score for the user, each of the generated images being configured to blend an appearance of the display surface with the environment of the multi-view display for a different observer of the multiple observers, wherein at least some of the images for the observers are generated with different levels of image quality based on the priority scores for the observers; and
concurrently displaying the generated images on the display surface of the multi-view display, such that each of the generated images is directed to the corresponding observer whose gaze direction was used to generate the image.

2. The method of claim 1, wherein generating an image being configured to blend an appearance of the display surface of the multi-view display with an environment of the multi-view display comprises using data representing images taken by one or more cameras directed toward the display surface of the multi-view display to capture an image that includes at least a portion of the display surface of the multi-view display and an adjacent view of the environment.

3. The method of claim 1, further comprising determining, for each of the multiple observers, a distance between the observer and the display surface;
wherein determining the priority scores comprises determining, for each of the multiple observers, the priority score based at least in part on the gaze direction of the observer and the distance of the observer from the display surface, wherein the priority scores are determined such that the priorities of the multiple observers are inversely correlated with the distance of the multiple observers from the multi-view display.

4. The method of claim 1, further comprising determining a measure of attentiveness each of the multiple observers to the multi-view display;
wherein determining the priority scores comprises determining, for each of the multiple observers, the priority score based at least in part on the gaze direction of the observer and the measure of attentiveness of the observer to the display surface, wherein the priority scores are determined such that the priority of the observers is positively correlated with the level of attention of the multiple observers to the multi-view display.

5. The method of claim 1, further comprising determining one or more preferences associated with a particular observer of the multiple observers, and wherein generating, for each of the multiple observers, an image comprises generating an image for the particular observer based on (i) a detected eye direction of the particular observer, and (ii) the one or more preferences associated with the particular observer.

6. The method of claim 1,
wherein generating, for each of the multiple observers, an image based on the determined gaze direction of the observer comprises generating each image to provide, to the corresponding observer, a view that blends (i) an appearance of the display surface from a perspective of the observer with (ii) an appearance of the environment of the display surface from the perspective of the observer.

7. The method of claim 1, comprising:
filtering the multiple observers based on the priority scores to select a proper subset of the multiple observers based on the assigned priority scores; and
wherein generating the images comprises generating an image, for display on the display surface, for only the selected proper subset of the multiple observers.

8. The method of claim 1, wherein determining the priority scores comprises determining the priority score for each observer based on one or more of (i) a position of the observer, (ii) a distance of the observer from the display surface, or (iii) an attentiveness of the observer to the display surface.

9. The method of claim 1, further comprising dynamically changing one or more of the displayed images on the multi-view display as one or more of the gaze directions of one or more of the multiple observers changes.

10. The method of claim 1, wherein generating, for each of the multiple observers, an image based on the determined gaze direction of the observer comprises generating, for each of the multiple observers, an image that provides a view of a scene behind the occluded object from the perspective of the observer.

11. The method of claim 10, wherein generating, for each of the multiple observers, an image based on the determined gaze direction of the observer comprises augmenting, for one or more of the multiple observers, an image representing the scene to include one or more added visual elements that are not in the environment of the multi-view display.

12. The method of claim 10, wherein generating, for each of the multiple observers, an image based on the determined gaze direction of the observer comprises generating, for one or more of the multiple observers, an image that represents a simplified version of the scene, wherein the simplified version omits one or more elements of the scene behind the occluded object that would have been visible from the perspective of the observer.

13. The method of claim 1, wherein concurrently displaying the generated images on the display surface of the multi-view display comprises:
  receiving data indicating one or more interactions of a particular observer of the multiple observers with a user device while the particular observer is in proximity to the multi-view display; and
  generating an image based on (i) the determined gaze direction of the observer and (ii) the data indicating one or more interactions of the particular observer with the user device while the particular observer in proximity to the multi-view display.

14. The method of claim 1, wherein generating, for each of the multiple observers, an image based on the determined gaze direction of the observer comprises, for the image generated for at least one of the observers, using a trained machine learning system to complete an incomplete image of the environment.

15. The method of claim 1, wherein determining the gaze directions comprises determining the gaze directions of one or more of the multiple observers using image data from one or more cameras to detect eye positions of observers in the environment of the multi-view display;
  wherein generating the images comprises:
    generating a first image with a first level of image quality for a first observer based on the first observer having an assigned priority score indicating a first level of priority; and
    generating a second image with a second level of image quality, which provides lower image quality than the first level of image quality, for a second observer based on the second observer having an assigned priority score indicating a second level of priority that is lower than the first level of priority.

16. The method of claim 1, wherein, to generate the images with different levels of image quality based on the priority scores, the images are generated to show the environment occluded by the multi-view display with different levels of fidelity, wherein the different levels of fidelity provide different levels of resolution, provide different levels of detail, or are updated at different rates.

17. The method of claim 1, further comprising determining, for each of the multiple observers, a distance between the observer and the display surface; and
  wherein generating the different images comprises generating the images for the observers to have different levels of resolution based on the observers being located at different distances from the display surface.

18. The method of claim 1, wherein the priority scores are determined based on gaze directions of the observers, distances of the observers from the multi-view display, and measures of attentiveness of the observers to the multi-view display.

19. The method of claim 1, comprising selecting, from among the multiple observers, a proper subset comprising observers determined to have a gaze direction that is toward the display surface, wherein the proper subset comprises observers having priority scores that exceed a predetermined priority score threshold or the proper subset comprises a predetermined number of observers selected according to the priority scores.

20. A system comprising:
  one or more computers and one or more storage devices storing instructions that are operable, when executed by the one or more computers, to cause the one or more computers to perform operations comprising:
    providing output from a directional multi-view display that occludes an object, the multi-view display having a side comprising a display surface;
    determining, for each of multiple observers located within an environment of the multi-view display, a gaze direction of the observer, wherein at least some of the multiple observers are determined to have a gaze direction that is toward the display surface;
    determining, for each of the multiple observers, a priority score based at least in part on the gaze direction of the observer;
    generating, for each of multiple observers determined to have a gaze direction that is toward the display surface, an image based on the determined gaze direction of the observer and the priority score for the user, each of the generated images being configured to blend an appearance of the display surface with the environment of the multi-view display for a different observer of the multiple observers, wherein at least some of the images for the observers are generated with different levels of image quality based on the priority scores for the observers; and
    concurrently displaying the generated images on the display surface of the multi-view display, such that each of the generated images is directed to the corresponding observer whose gaze direction was used to generate the image.

21. One or more non-transitory computer-readable media storing instructions that, when executed by one or more computers, cause the one or more computers to perform operations comprising:
  providing output from a directional multi-view display that occludes an object, the multi-view display having a side comprising a display surface;
  determining, for each of multiple observers located within an environment of the multi-view display, a gaze direction of the observer, wherein at least some of the multiple observers are determined to have a gaze direction that is toward the display surface;
  determining, for each of the multiple observers, a priority score based at least in part on the gaze direction of the observer;
  generating, for each of multiple observers determined to have a gaze direction that is toward the display surface, an image based on the determined gaze direction of the observer and the priority score for the user, each of the generated images being configured to blend an appearance of the display surface with the environment of the multi-view display for a different observer of the multiple observers, wherein at least some of the images for the observers are generated with different levels of image quality based on the priority scores for the observers; and
  concurrently displaying the generated images on the display surface of the multi-view display, such that each of the generated images is directed to the corresponding observer whose gaze direction was used to generate the image.

* * * * *